US008608271B2

(12) United States Patent
Murayama et al.

(10) Patent No.: US 8,608,271 B2
(45) Date of Patent: Dec. 17, 2013

(54) PRINTING APPARATUS AND PRINTING METHOD

(75) Inventors: Yoshiaki Murayama, Tokyo (JP); Yuji Konno, Kawasaki (JP); Hitoshi Nishikori, Inagi (JP); Norihiro Kawatoko, Yokohama (JP); Yutaka Kano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 12/732,764

(22) Filed: Mar. 26, 2010

(65) Prior Publication Data
US 2010/0245470 A1 Sep. 30, 2010

(30) Foreign Application Priority Data

Mar. 31, 2009 (JP) ................................. 2009-087192

(51) Int. Cl.
*B41J 2/205* (2006.01)
(52) U.S. Cl.
USPC .......................................................... 347/15
(58) Field of Classification Search
None
See application file for complete search history.

(56) References Cited

U.S. PATENT DOCUMENTS

| 5,594,478 | A | 1/1997 | Matsubara et al. |
| 6,158,836 | A | 12/2000 | Iwasaki et al. |
| 6,334,659 | B1 | 1/2002 | Maeda et al. |
| 6,364,446 | B1 | 4/2002 | Ishikawa et al. |
| 6,390,586 | B1 | 5/2002 | Takahashi et al. |
| 6,764,154 | B2 | 7/2004 | Nishikori et al. |
| 6,963,423 | B2 | 11/2005 | Ogasahara et al. |
| 6,991,316 | B2 | 1/2006 | Maru et al. |
| 7,261,387 | B2 | 8/2007 | Nishikori et al. |
| 7,303,247 | B2 | 12/2007 | Maru et al. |
| 7,706,023 | B2 | 4/2010 | Kanda et al. |
| 2002/0001489 | A1 | 1/2002 | Ozaki et al. |
| 2002/0021319 | A1 | 2/2002 | Kawatoko et al. |
| 2002/0057308 | A1* | 5/2002 | Iwasaki et al. ................... 347/41 |
| 2003/0035021 | A1* | 2/2003 | Masuyama et al. ............. 347/40 |

(Continued)

FOREIGN PATENT DOCUMENTS

| JP | 5-31922 A | 2/1993 |
| JP | 10-81025 A | 3/1998 |

(Continued)

OTHER PUBLICATIONS

Chinese Office Action dated Jul. 31, 2012, in counterpart Chinese Patent Application No. 201010141933.4.

*Primary Examiner* — Matthew Luu
*Assistant Examiner* — Alejandro Valencia
(74) *Attorney, Agent, or Firm* — Fitzpatrick, Cella, Harper & Scinto

(57) ABSTRACT

A printing apparatus and a printing method are capable of not permitting a printable ratio of each printing scan to have a deviation and, even if a sudden conveyance shift occurs, outputting a uniform and smooth image in the whole area of the print medium. In order to achieve this, when performing multipass printing of 2M passes, a mask such that a printable area overlapping ratio that relates to straddling between Pass M and Pass M+1 is set higher than the printable area overlapping ratio that relates to straddling between two other consecutive passes is used. By this configuration, even if a complementary relationship of dots collapses due to a sudden conveyance shift or the like and thereby a density reduction is anticipated, by an overlapped dot being separated, increase of the density is accelerated, and it becomes possible to mitigate the above-mentioned density reduction.

9 Claims, 35 Drawing Sheets

(56) References Cited

U.S. PATENT DOCUMENTS

| | | |
|---|---|---|
| 2007/0126789 A1* | 6/2007 | Nishikori et al. ............... 347/40 |
| 2007/0273720 A1 | 11/2007 | Yasutani et al. |
| 2010/0245445 A1 | 9/2010 | Kano et al. |
| 2010/0245446 A1 | 9/2010 | Nishikori et al. |

FOREIGN PATENT DOCUMENTS

| | | |
|---|---|---|
| JP | 2001-322262 A | 11/2001 |
| JP | 2002-14552 A | 1/2002 |
| JP | 2002-29097 A | 1/2002 |
| JP | 2002-144637 A | 5/2002 |

* cited by examiner

Lv0 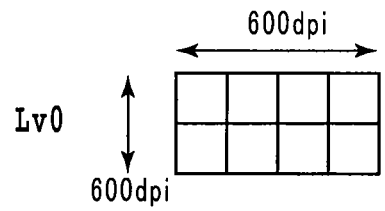
Lv1 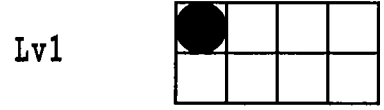
Lv2 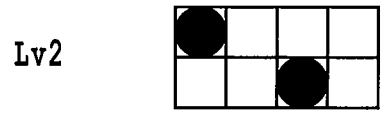
Lv3 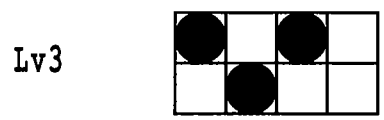
Lv4 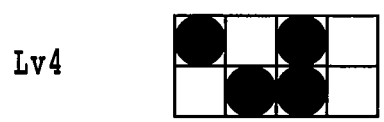
Lv5 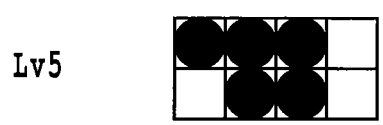
Lv6 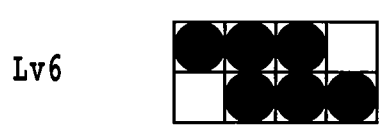
Lv7 
Lv8 
Lv0 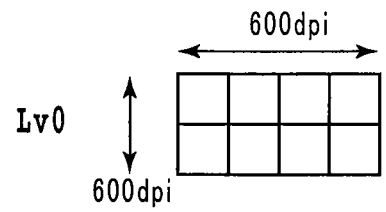
Lv1 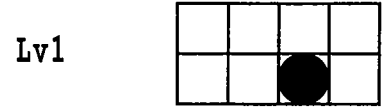
Lv2 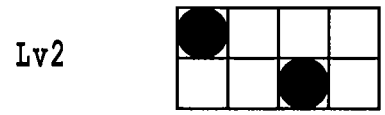
Lv3 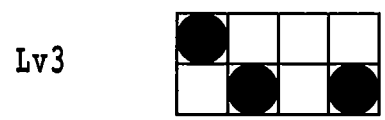
Lv4 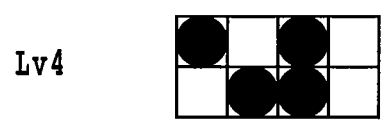
Lv5 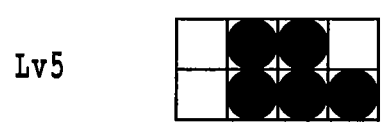
Lv6 
Lv7 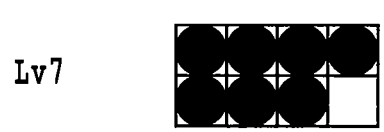
Lv8 
FIG.7A     FIG.7B

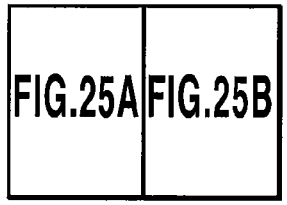
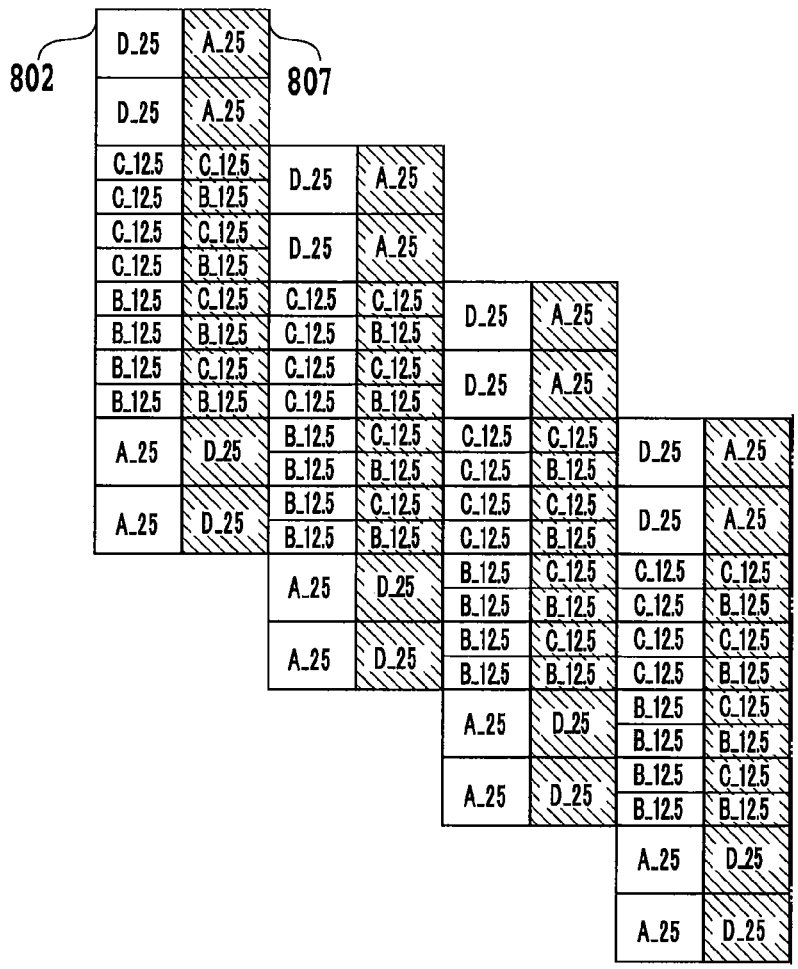
FIG.25A

| FIG.28 |
|---|
| FIG.28A |
| FIG.28B |
| FIG.29C |

PRINTING APPARATUS AND PRINTING METHOD

BACKGROUND OF THE INVENTION

1. Field of the Invention

The present invention relates to an ink jet printing method for reducing image quality deterioration resulting from a print position shift in printing scan quantities when performing multipass printing using a serial type ink jet printing apparatus.

2. Description of the Related Art

As one example of the printing method using a printing head equipped with a plurality of printing elements for printing dots, there is known an ink jet printing method of printing dots on a print medium by making the printing elements discharge inks. The ink jet printing apparatus uses a printing head in which a plurality of printing elements are arranged. In the printing head, there is a case where variation arises in a discharge amount and a discharge direction among the printing elements, such variations may cause occurrence of density unevenness and stripes in an image.

As a technology for mitigating such density unevenness and stripes, the multipass printing method is known. In a multipass printing system, image data that should be printed in a unit area of the print medium is divided into pieces of image data that are printed by several times of translation (hereinafter referred to as a printing scan) that accompany a plurality of times of printing by the printing head, respectively. Then, by a plurality of printing scans among which conveyance operations intervene, the above-mentioned divided image data is sequentially printed. By doing this, even if a discharge characteristic of an individual printing element includes an irregularity, it does not happen that the dots printed by one printing element exist successively in a scanning direction, and it is possible for an influence of the individual printing element to be dispersed in a wide range. As a result, it is possible to obtain a uniform and smooth image.

When performing the multipass printing as explained above, it will be required to divide an image data for an individual printing scan. Generally, for division like this, it is often the case that a mask pattern in which a printable area (1) that permits printing of the dots and a non-printable area (0) that does not permit printing of the dots are arranged in advance is used. In this case, by conducting a logical AND operation between the binary image data that should be printed in the unit area of the print medium and the above-mentioned mask pattern, the binary image data is divided into pieces of binary image data each of which should be printed in each printing scan.

Generally, in the mask pattern (hereinafter also referred to as only a mask), an arrangement of the printable areas (1) is determined so that the complementary relationship may be built among a plurality of printing scans (or a plurality of printing heads). That is, the printing is configured so that one dot is printed by either one of printing scans on a pixel that is defined as printing (1) by the binary image data. By adopting this configuration, image information before division is made to be saved even after the division.

However, in recent years, density variation and the density unevenness resulting from a shift of a print position (registration) in printing scan quantities or in printing head (nozzle row) quantities have become to be newly considered as problems because of performing the above-mentioned multipass printing. Here, the shift of the print position in printing scan quantities or in nozzle row quantities means a shift between dot groups (planes), such as a shift between the dot group printed by the first printing scan (nozzle row) and the dot group printed by the second printing scan (another nozzle row). The shift between these planes is brought about by a variation of a distance between the print medium and a discharge port plane (head-medium distance), a variation of the amount of conveyance of the print medium, etc. Then, if the shift between planes occurs, coverage of the dots relative to the print medium will vary, which will invite density fluctuation and the density unevenness of an image. Hereafter, as described above, the dot group and a pixel group that are printed by the same printing scan of the same means (i.e., a nozzle row for discharging the same kind of ink) are referred to as a plane.

Normally, the print medium is conveyed by the two roller pairs of a convey roller pair located at an upstream side of conveyance and a print medium discharging roller pair located at a downstream side, but it is known that the density unevenness and the density fluctuation as described above are affected by decentering of these rollers and a change of straddling state of the print medium. Some concrete examples are given below.

(1) In the case where the amount of conveyance of the print medium is not constant even if the amount of rotation of the roller is constant due to the decentering of the roller and slip between the roller and the print medium, the above-mentioned shift between planes occurs periodically.

(2) In a situation of printing a head part and a tail part of the print medium, the straddling reduces to one that is done by one side of the roller pair. Therefore, conveyance at each time becomes unstable or a variation of head-medium distance becomes easy to occur, which makes the shift between planes occur.

(3) When a state where the print medium is straddled only by a conveyance roller pair is switched to a state where it is straddled by two roller pairs of the conveyance roller pair and a print medium discharging roller pair, variations of a conveyance force and a head-medium distance occur suddenly. Therefore, a location where the print medium is sent by a volume larger or smaller than a predetermined conveyance volume arises suddenly and the shift between the planes occurs.

(4) When a state where the print medium is straddled by two roller pairs of the conveyance roller pair and the print medium discharging roller pair is switched to a state where it is straddled only by the print medium discharging roller pair, variations of the conveyance force and the head-medium distance occur suddenly. Therefore, a location where the print medium is sent by a volume larger or smaller than the predetermined conveyance volume arises suddenly and the shift between planes occurs.

Against such a problem, for example, Japanese Patent Laid-Open No. 2002-144637 discloses a technology of reducing a printing ratio in the multipass printing, i.e., a ratio of printable pixels of a mask being used in a location where especially print position shift between planes is easy to occur, such as in the head part and the tail part of the print medium. Since the substantial number of the dots to be printed at the location concerned, i.e., the number of the shifted dots can be reduced by decreasing the ratio of the printable pixels of the mask being used, the print position shift of these dots becomes hard to notice as an image.

However, in the case where a mask whose ratio of printable pixels corresponding to a part of printing scans is reduced is used like Japanese Patent Laid-Open No. 2002-144637, there arises a possibility that an original effect of the multipass printing, that is, an effect of obtaining a smooth image by dispersing influences of the individual printing elements is impaired. Already explained, this is because, since generally arrangements of printable pixels are in a mutually complementary relationship among a plurality of printing scans, if the printing ratio of a part of printing scans is reduced, a ratio of printable pixels of an other printing scan will increase, and an influence of the printing elements corresponding to this scan become easy to appear in an image. Moreover, since a timing at which the ink is given to the unit area of the print medium by a plurality of printing scans and its quantity will differ in each unit area, the density unevenness accompanying this will also be brought about. Furthermore, increasing the printing ratio of a part of the printing head becomes a cause of shortening the life of the printing head.

Moreover, in Japanese Patent Laid-Open No. 2002-144637, since the above-mentioned special mask is used especially only to the head part and the tail part of the print medium, the apparatus cannot respond to a conveyance shift that occurs suddenly in a central part of the print medium and the like.

That is, also when the print position shift between a plurality of printing scans suddenly occurs, it is a difficult situation to print an image that is uniform and smooth in the whole area of the print medium.

SUMMARY OF THE INVENTION

The present invention is made in order to solve the above-mentioned problem. Therefore, its object is to provide a printing apparatus and a printing method capable of outputting an image that does not permit a printable ratio of each printing scan to have a deviation and, even if a sudden conveyance shift occurs, outputting the image that is uniform and smooth in the whole area of a print medium.

The first aspect of the present invention is a printing apparatus prints by making a printing head do printing scan for a unit area of the print medium by 2M times (M is an integer larger than 1) comprising: dividing unit which divides image data that should be printed in the unit area into 2M pieces of image data for the 2M times printing scan (Pass 1 to Pass 2M) by using a mask: the mask setting printable areas included in the unit area for each of the 2M times printing scan respectively, so that plural dots of the same type of color may be printed at the same area at least by two printing scan; and Printing unit which prints dots in the printable areas by each of the 2M times printing scan (Pass 1 to Pass 2M) according to the divided image data; wherein the mask is configured so that i) a ratio of the printable areas in which printing is permitted both by passes performed before Pass (M+1) and by passes performed after Pass M is larger than a ratio of the printable areas in which printing is permitted both by passes performed before Pass N+1 (N is an integer differing from M and smaller than 2M) and by passes performed after Pass N, ii) a ratio of the printable areas in which printing is permitted both by passes performed before Pass (M−L+1) (L is a positive integer smaller than M) and by passes performed after Pass (M−L) is smaller than a ratio of the printable areas in which printing is permitted both by passes performed before Pass (M−L+2) and by passes performed after Pass (M−L+1), and a ratio of the printable areas in which printing is permitted both by passes performed before Pass (M+L+1) and by passes performed after Pass (M+L) is larger than a ratio of the printable areas in which printing is permitted both by passes performed before Pass (M+L+2) and by passes performed after Pass (M+L+1), iii) as for at least one combination of S and T (S and T are different and positive integer smaller than 2M), a difference between a ratio of the printable areas in which printing is permitted between both by passes performed before Pass (S+1) and by passes performed after Pass S and a ratio of the printable areas in which printing is permitted between both by passes performed before Pass (S+23) and by passes performed after Pass (S+21), is different from a difference between a ratio of the printable areas in which printing is permitted between both by passes performed before Pass (T+1) and bypasses performed after Pass T and a ratio of the printable areas in which printing is permitted between both by passes performed before Pass (T+23) and by passes performed after Pass (T+12).

The second aspect of the present invention is a printing apparatus prints by making a printing head do printing scan for a unit area of the print medium by 2M+1 times (M is an integer larger than 1) comprising: dividing unit which divides image data that should be printed in the unit area into 2M+1 pieces of image data for the 2M+1 times printing scan (Pass 1 to Pass 2M+1) by using a mask: the mask setting printable areas included in the unit area for each of the 2M+1 times printing scan respectively, so that plural dots of the same color may be printed at the same area at least by two printing scan; and Printing unit which prints dots in the printable areas by each of the 2M+1 times printing scan (Pass 1 to Pass 2M+1) according to the divided image data; wherein the mask is configured so that a ratio of the printable areas in which printing is permitted both by passes performed before Pass (M+1) and by passes performed after Pass M and a ratio of the printable areas in which printing is permitted both by passes performed before Pass (M+2) and by passes performed after Pass (M+1) are larger than a ratio of the printable areas in which printing is permitted both by passes performed before Pass (N+1) (N is an integer differing from M or M+1 and smaller than 2M) and by passes performed after Pass N, ii) as for a combination of S and T (S and T are different and positive integer smaller than 2M), a difference between a ratio of the printable areas in which printing is permitted both by passes performed before Pass (S+1) and by passes performed after Pass S and a ratio of the printable areas in which printing is permitted both by passes performed before Pass (S+32) and by passes performed after Pass (S+12), is different from a difference between a ratio of the areas in which printing is permitted both by passes performed before Pass (T+1) and by passes performed after Pass T and a ratio of the printable areas in which printing is permitted both by passes performed before Pass (T+23) and by passes performed after Pass (T+12).

The third aspect of the present invention is a printing method for printing by making a printing head do printing scan for a unit area of the print medium by 2M times (M is an integer larger than 1) comprising: dividing step to divide image data that should be printed in the unit area into 2M pieces of image data for the 2M times printing scan (Pass 1 to Pass 2M) by using a mask: the mask setting printable areas included in the unit area for each of the 2M times printing scan respectively, so that plural dots of the same type of color may be printed at the same area at least by two printing scan; and Printing step to print dots in the printable areas by each of the 2M times printing scan (Pass 1 to Pass 2M) according to the divided image data; wherein the mask is configured so that i) a ratio of the printable areas in which printing is permitted both by passes performed before Pass (M+1) and by passes performed after Pass M is larger than a ratio of the printable areas in which printing is permitted both by passes performed before Pass (N+1) (N is an integer differing from M and smaller than 2M) and by passes performed after Pass N, ii) a ratio of the printable areas in which printing is permitted both by passes performed before Pass (M−L+1) (L is a positive integer smaller than M) and by passes performed after Pass (M−L) is smaller than a ratio of the printable areas in which printing is permitted both by passes performed before Pass (M−L+2) and by passes performed after Pass (M−L+1), and a ratio of the printable areas in which printing is permitted both by passes performed before Pass (M+L+1) and by passes performed after Pass (M+L) is larger than a ratio of the printable areas in which printing is permitted both by passes performed before Pass (M+L+2) and by passes performed after Pass (M+L+1), iii) as for at least one combination of S and T (S and T are different and positive integer smaller than 2M), a difference between a ratio of the printable areas in which printing is permitted both by passes performed before Pass (S+1) and by passes performed after Pass S and a ratio of the printable areas in which printing is permitted both by passes performed before Pass (S+23) and by passes performed after Pass (S+12), is different from a difference between a ratio of the printable areas in which printing is permitted both by passes performed before Pass (T+1) and by passes performed after Pass T and a ratio of the printable areas in which printing is permitted both by passes performed before Pass (T+32) and by passes performed after Pass (T+12).

The fourth aspect of the present invention is a printing method for printing by making a printing head do printing scan for a unit area of the print medium by 2M+1 times (M is an integer larger than 1) comprising: dividing step to divide image data that should be printed in the unit area into 2M+1 pieces of image data for the 2M+1 times printing scan (Pass 1 to Pass 2M+1) by using a mask: the mask setting printable areas included in the unit area for each of the 2M+1 times printing scan respectively, so that plural dots of the same type of color may be printed at the same area at least by two printing scan; and printing step which prints dots in the printable areas by each of the 2M+1 times printing scan (Pass 1 to Pass 2M+1) according to the divided image data; wherein the mask is configured so that a ratio of the printable areas in which printing is permitted both by passes performed before Pass (M+1) and by passes performed after Pass M and a ratio of the printable areas in which printing is permitted both by passes performed before Pass (M+2) and by passes performed after Pass (M+1) are larger than a ratio of the printable areas in which printing is permitted both by passes performed before Pass (N+1) (N is an integer differing from M or M+1 and smaller than 2M) and by passes performed after Pass N, ii) as for a combination of S and T (S and T are different and positive integer smaller than 2M), a difference between a ratio of the printable areas in which printing is permitted both by passes performed before Pass (S+1) and by passes performed after Pass S and a ratio of the printable areas in which printing is permitted both by passes performed before Pass (S+32) and by passes performed after Pass (S+12), is different from a difference between a ratio of the printable areas in which printing is permitted both by passes performed before Pass (T+12) and by passes performed after Pass T and a ratio of the printable areas in which printing is permitted both by passes performed before Pass (T+32) and by passes performed after Pass (T+12).

Further features of the present invention will become apparent from the following description of exemplary embodiments (with reference to the attached drawings).

BRIEF DESCRIPTION OF THE DRAWINGS

FIGS. 7A and 7B are schematic diagrams for explaining the multiple-value quantized data having nine stages of levels and a dot matrix pattern corresponding to each level;

FIG. 25 is a diagram showing the relationship of FIGS. 25A and 25B;

FIG. 25A is a diagram for explaining an occurrence state of the density fluctuation when the conveyance shift occurs in one certain conveyance operation in the case where the mask of the second embodiment of the present invention is used;

FIG. 27 is a diagram showing the relationship of FIGS. 27A to 27C;

FIG. 27B is a schematic diagram for explaining a multipass printing method applied to a third embodiment of the present invention;

FIG. 27C is a schematic diagram for explaining a multipass printing method applied to a third embodiment of the present invention;

FIG. 28 is a diagram showing the relationship of FIGS. 28A to 28C;

FIG. 28A is a diagram for explaining a state of overlapping or separation of each dot about 15 areas (unit areas 2 to 16) to which the influence of the conveyance shift exerts in the third embodiment;

FIG. 28B is a diagram for explaining a state of overlapping or separation of each dot about 15 areas (unit areas 2 to 16) to which the influence of the conveyance shift exerts in the third embodiment;

FIG. 28C is a diagram for explaining a state of overlapping or separation of each dot about 15 areas (unit areas 2 to 16) to which the influence of the conveyance shift exerts in the third embodiment;

DESCRIPTION OF THE EMBODIMENTS

Hereafter, embodiments in the present invention will be explained in detail with reference to drawings.

First Embodiment

Figure 1:
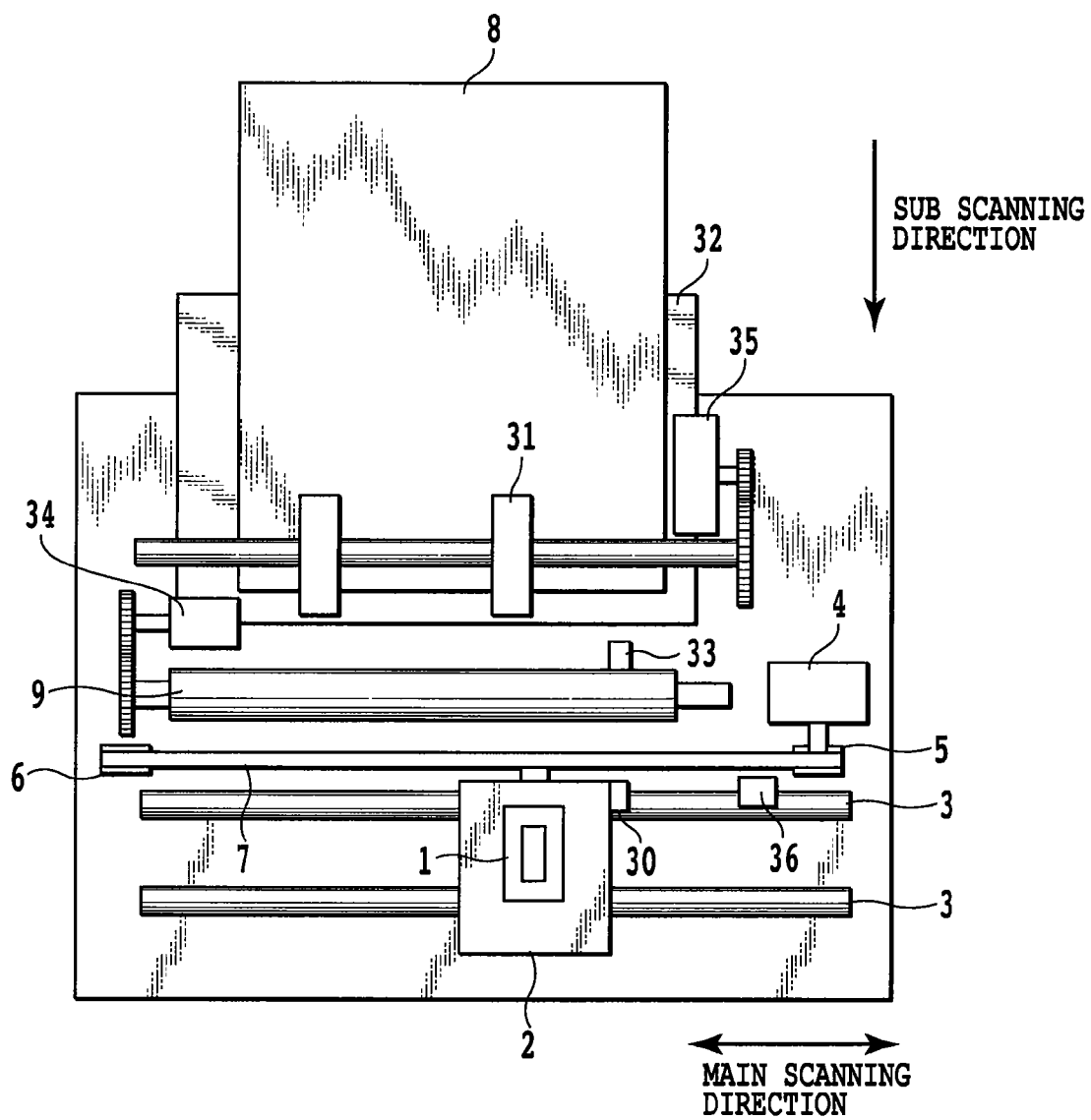
FIG. 1 is a diagram showing a fundamental configuration of a main mechanism part of an ink jet printing apparatus to which the present invention can be applied.

FIG. 1 is a diagram showing a fundamental configuration of a main mechanism part of an ink jet printing apparatus to which the present invention can be applied. A head cartridge 1 consists of a printing head 201, an ink tank part, and a connector for delivering and receiving a signal for driving the printing head, etc. (not illustrated). Moreover, the head cartridge 1 is mounted on a carriage 2 exchangeably, and the carriage 2 is provided with a connector holder (electric connection part) for transmitting a driving signal etc. to the head cartridge 1 through the connector.0025]

The carriage 2 is guided and supported in a reciprocation movable manner by a guide shaft 3 which extends along a main scanning direction and is installed in the apparatus main frame. In addition, the carriage 2 is driven by a main scanning motor 4 through a drive mechanism of a motor pulley 5, a following pulley 6, a timing belt 7, etc. and is controlled with respect to position and translation. Moreover, a home position sensor 30 is provided in the carriage 2. This makes it possible to, when the home position sensor 30 on the carriage 2 passes a position of a shield 36, know that the carriage reaches the home position.

A print medium 8 such as a paper and a plastic thin sheet is separated and supplied from an auto sheet feeder (hereinafter referred to also as an ASF) one sheet by one sheet by rotating a pick-up roller 31 by a feed motor 35 through a gear. Then, the print medium 8 is conveyed (sub-scan) by rotation of a conveying roller 9 passing through a position (printing part) facing the discharge port plane of the printing head 201 provided in the head cartridge 1. The rotation of the conveying roller 9 is done by rotation of a LF motor 34 through a gear. At that time, determination as to whether the print medium is fed and fixation of a beginning position at the time of print medium feeding are conducted at the time when the print medium 8 passes through a paper end sensor 33. Furthermore, also in order to find where a rear end of the print medium exists and finally calculate a current print position from the actual rear end, the paper end sensor 33 is used.

Incidentally, the print medium 8 is supported by a platen (not illustrated) at its back side so that a flat printing surface may be formed in the printing part. In doing this, the head cartridge 1 mounted on the carriage 2 is held so that the discharge port plane of the printing head 201 may become parallel to the print medium 8.

Figure 2:
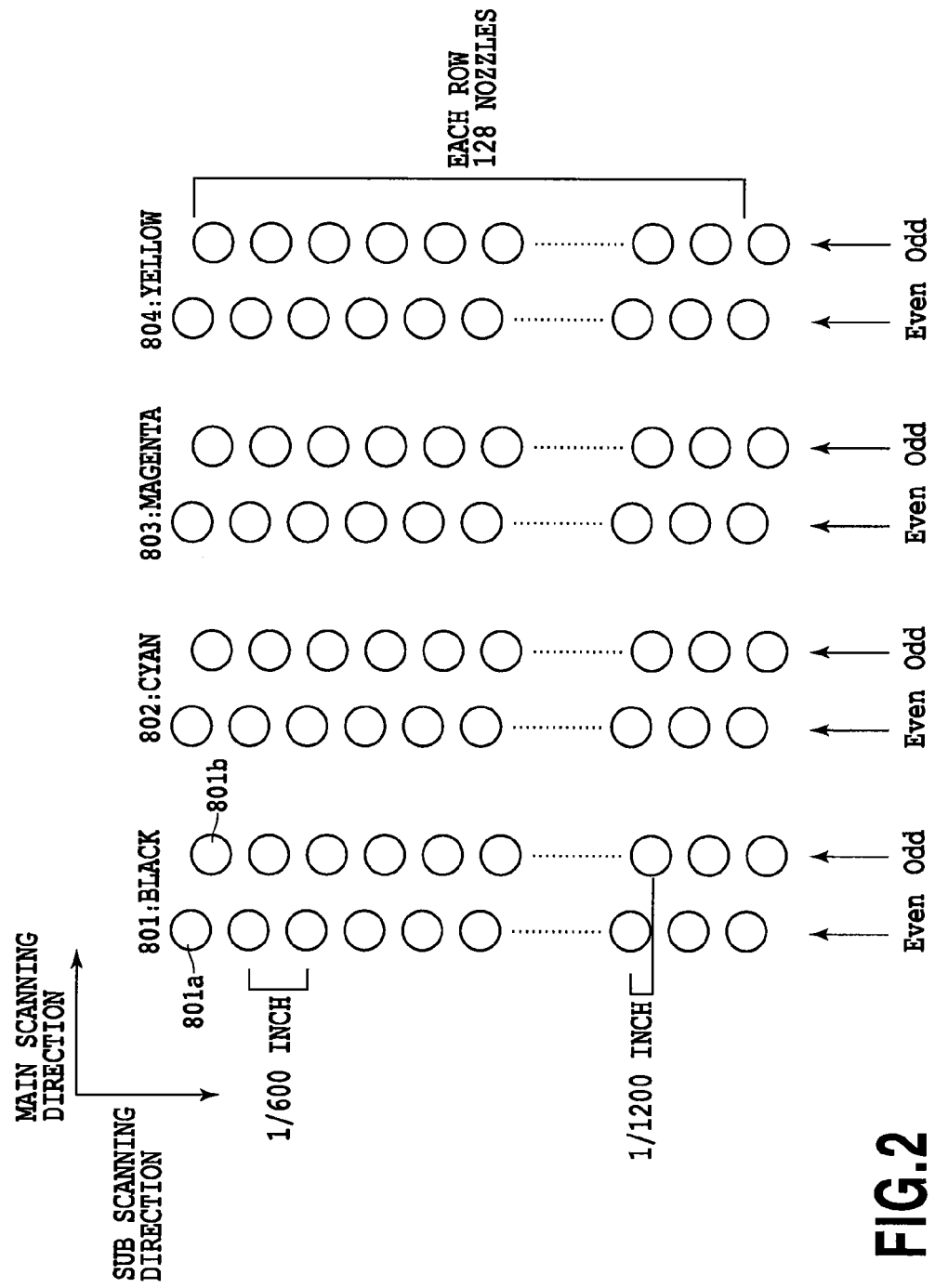
FIG. 2 is a diagram for explaining an arrangement configuration of discharge ports (nozzles) of a printing head 201.

FIG. 2 is a diagram for explaining an arrangement configuration of discharge ports (nozzles) of the printing head 201. In the figure, a numeral 801 designates a nozzle row for black ink (K), 802 designates a nozzle row for cyan ink (C), 803 designates a nozzle row for magenta ink (M), and 804 designates a nozzle row for yellow ink (Y), respectively. The four color nozzle rows are each composed of an even number nozzle row and an odd number nozzle row, respectively, which correspond to numerals 801a and 801b in the case of black ink, respectively. Below, the arrangement configuration of the discharge ports will be explained in detail taking the nozzle row 801 of back ink as an example.

In each of the even number nozzle row 801a and the odd number nozzle row 801b, 128 discharge ports are arranged with a pitch of 600 dpi in a sub-scan direction. Furthermore, the even number nozzle row 801a and the odd number nozzle row 801b are arranged being mutually shifted by 1200 dpi in a Y-direction (the sub-scan direction). That is, by the printing head discharging the ink while scanning in an X-direction (the main scanning direction), an image of a width of about 5.42 mm can be printed with a 1200 dpi resolution in the sub-scan direction.

The nozzle rows of other colors have each the same configuration as that of the nozzle row 801 of black, and these four color nozzle rows are arranged in the main scanning direction as shown in the figure.

Each individual nozzle of the printing head 201 is equipped with, for example, an electrothermal transducing element for discharging the ink using thermal energy. Upon supply of electric power, the electrothermal transducing element generates heat, and produces film boiling in the ink that contacts it. Then, the nozzle has the mechanism that the ink is discharged from the discharge port by growth energy of air bubbles produced by this film boiling. Although the configuration equipped with an electrothermal transducing element in order to obtain discharge energy was shown here, neither the present invention nor this embodiment is restricted to such a configuration. A configuration that a piezoelectric element is provided to an individual printing element, which discharges the ink from the discharge port by a pressure of the piezoelectric element that is supplied electric power, can be used.

Figure 3:
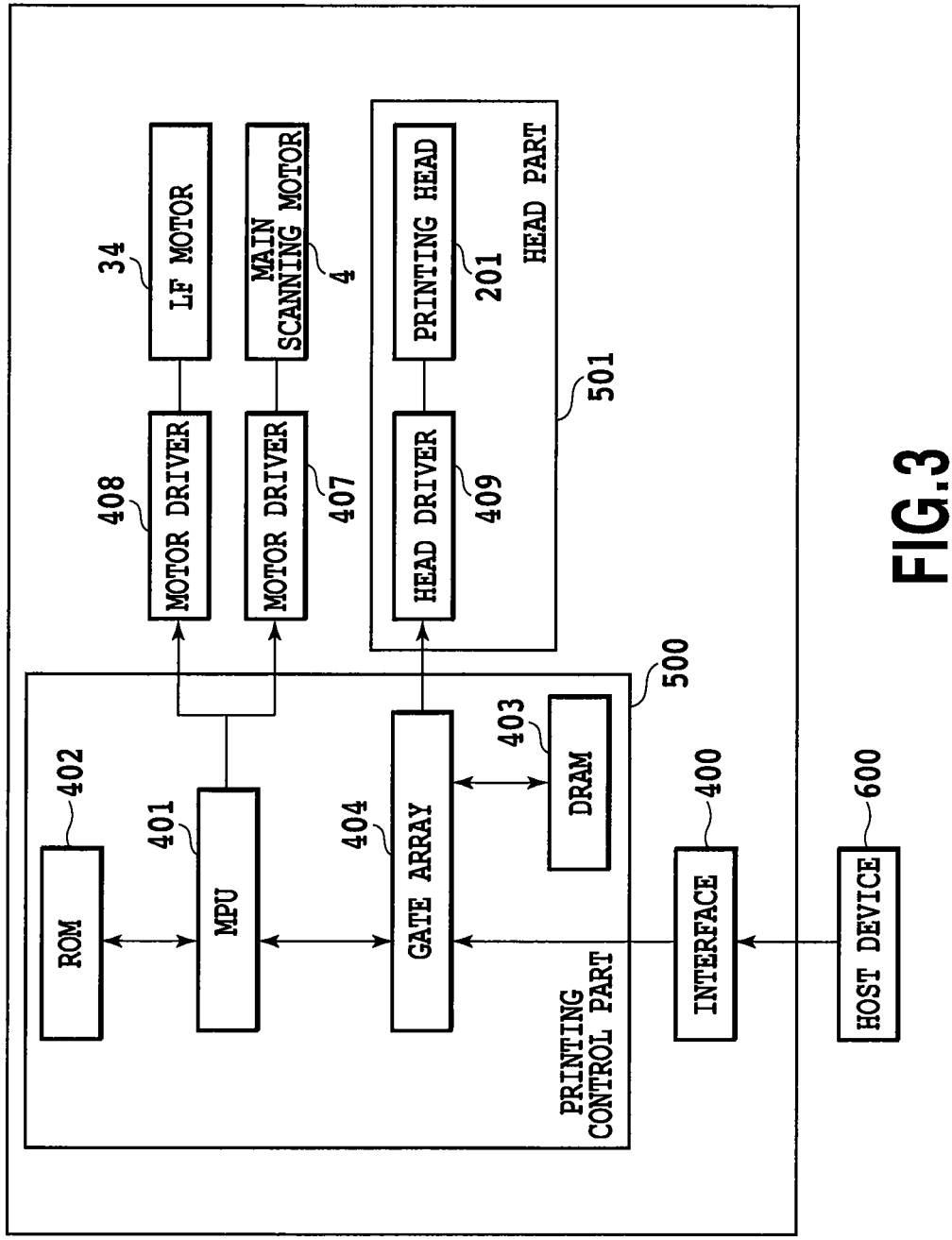
FIG. 3 is a block diagram showing a control configuration of a printing apparatus applicable to an embodiment of the present invention.

FIG. 3 is a block diagram showing a control configuration of a printing apparatus 700 of this embodiment. In the figure, the printing control part (or referred to simply as a "control part") 500 is inputted a print start signal and quantized data from a host device 600 connected to the outside through an interface 400. Attending with input of this print start signal, a control program stored in ROM 402 is executed by a MPU 401. The control program includes, for example, a dot matrix allocation processing that will be described later, and the like.

A gate array 404 performs supply control of image data to the printing head 201, and performs also transfer control of the data among the interface 400, the MPU 401, and DRAM 403. The DRAM 403 is dynamic type memory for saving various data (the print start signal, the image data supplied to a printing head 410, etc.), and can store also the number of print dots, the number of times of exchange of the printing head, etc. The DRAM 403 also bears a role of a receive buffer 1001, development buffers 1004, 1005, and a dot matrix storage unit 1002 (refer to FIG. 5) that will be described later.

Motor drivers 407, 408 drive the main scanning motor 4 that conveys the head cartridge 1 equipped with the printing head 201, and the LF motor 34. Moreover, a head driver 409 drives the printing head 201.

Figure 4:
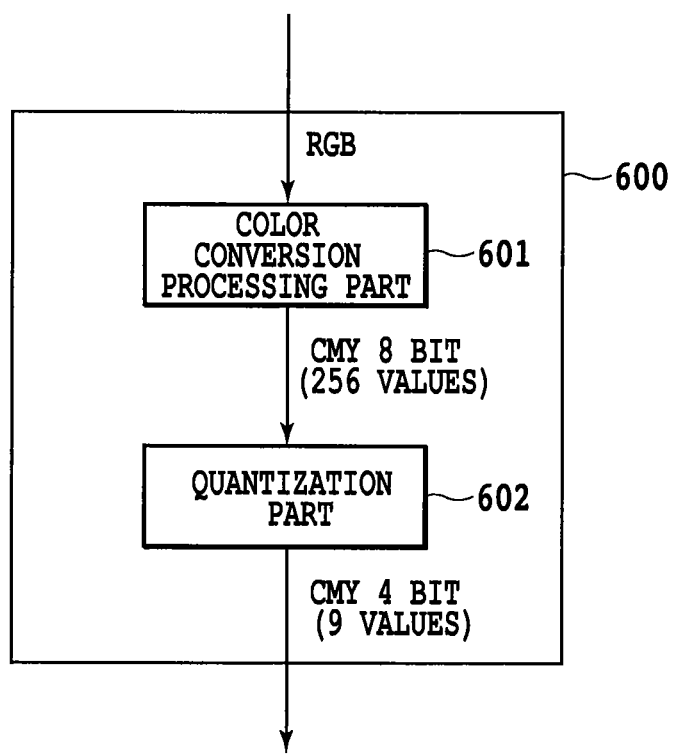
FIG. 4 is a block diagram for explaining a data processing that a host device executes.

FIG. 4 is a block diagram for explaining a data processing that the host device 600 performs. The host device 600 performs a color conversion processing 601 and a quantization processing 602.

In the color conversion processing 601, the image data of RGB each being 8 bit received from application etc. is converted into multiple valued data corresponding to inks used in the printing apparatus, i.e., cyan (C), magenta (M), and yellow (Y). Here, it is converted into 8-bit data having 256 gray scales for each color. Moreover, a resolution of a pixel shall be 600 dpi (dot/inch).

In the continuing quantization processing 602, the received multiple valued data is quantized into an N valued (N<256) of a reduced level. Specifically, 256 valued data of C, M, and Y is quantized into nine valued data of 4 bit with a 600 dpi resolution, respectively. To conduct the quantization processing, a general multiple-value error diffusion method may be used or a dither matrix method may be used. The N valued image data quantized in this way is called henceforth "quantized data" or "multiple-value quantized data" in this specification. The multiple-value quantized data with a 600 dpi resolution is transmitted to the control part 500 of the printing apparatus through the interface 400.

Figure 5:
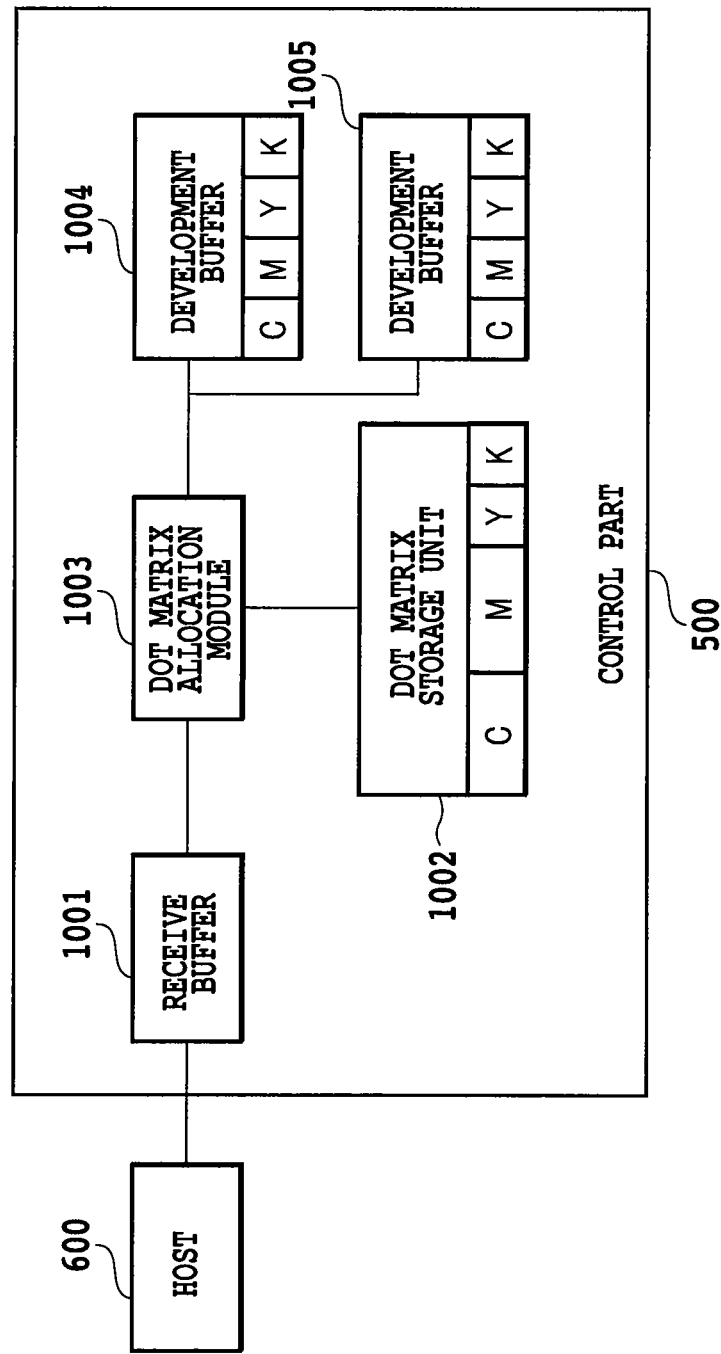
FIG. 5 is a block diagram for explaining conversion of multiple-value quantized data received from a host device and its storage state in a control part.

FIG. 5 is a block diagram for explaining conversion and a storage state of the multiple-value quantized data received from the host device 600 in the control part 500. The receive buffer 1001 is a buffer for storing the received multiple-value quantized data. A dot matrix allocation module 1003 calls the multiple-value quantized data with a 600 dpi resolution stored in the receive buffer 1001 for one pixel, and selects a dot matrix pattern corresponding to the data concerned from the dot matrix storage unit 1002. The selected dot matrix pattern is binary data with a 1200 dpi resolution and is stored in the two development buffers 1004 and 1005. In this embodiment, the dot matrix allocation module 1003 and the development buffers 1004 and 1005 function as a binarization processing part for performing a binarization processing. Incidentally, the dot matrix allocation module 1003 is a software module that is stored in advance in the ROM 402 and is executed in the MPU 401. Moreover, the receive buffer 1001, the dot matrix storage unit 1002, and the development buffers 1004 and 1005 are stored in predetermined address areas of the DRAM 403 shown in FIG. 3.

Figure 6:
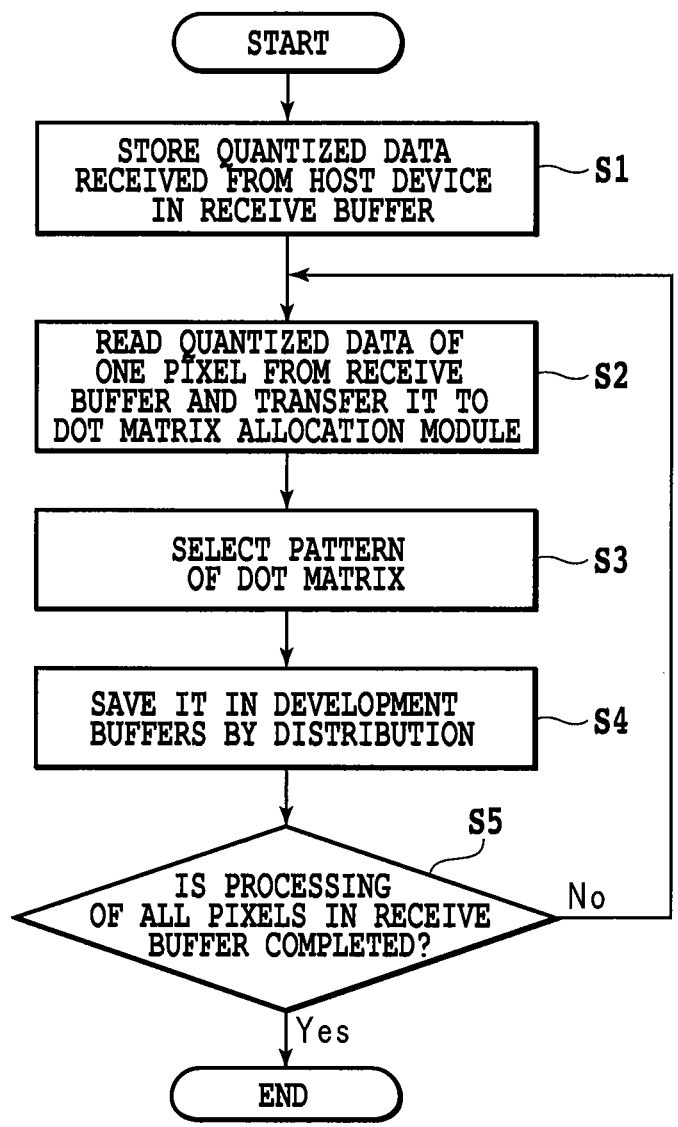
FIG. 6 is a flowchart for explaining a dot matrix allocation processing that the control part in this embodiment of the present invention performs.

FIG. 6 is a flowchart for explaining the dot matrix allocation processing that the control part 500 of this embodiment executes.

First, at Step S1, the control part 500 stores the multiple-value quantized data of 4 bit with a 600 dpi resolution received from the host device 600 in the receive buffer 1001. In continuing Step S2, the control part 500 reads out the quantized data for one pixel from the data stored in the receive buffer 1001, and transfer it to the dot matrix allocation module 1003.

At Step S3, the control part 500 selects the dot matrix pattern corresponding to the multiple-value quantized data transferred to the dot matrix allocation module 1003 from the dot matrix storage unit 1002.

FIG. 7 is a schematic diagram for explaining the multiple-value quantized data having nine stages of levels, and the dot matrix pattern corresponding to each level. A left column shows gray scale levels from level 0 to level 8 that one pixel (600 dpi) of the multiple-value quantized data has, and column A and column B show two kinds of dot matrix patterns each of which corresponds to each level. One dot matrix pattern has a domain of (four areas)×(two areas), and an individual square corresponds to an area in which one dot can be printed. Any area designated by a solid circle shows an area in which the dot is printed (1), and any blank area shows an area in which the dot is not printed (0), respectively. According to the figure, it is understood that as a level of the multiple-value quantized data increases, areas for printing the dots in (four areas)×(two areas) increase in number. In the control part 500, the dot matrix pattern made up of binary data such that printing (1) or non-printing (0) is defined in area quantities in this way is stored in the dot matrix storage unit 1002 being brought into correspondence with each level of the multiple-value quantized data. For one piece of the multiple-value quantized data, the control part 500 selects the dot matrix pattern shown in a row A and the dot matrix pattern shown in a row B alternately in the main scanning direction.

The description returns to the flowchart of FIG. 6 again. When at Step S3, the dot matrix pattern is selected, the control part distributes these two matrix patterns and develops them in the development buffers 1004 and 1005 at Step S4.

Figure 8:
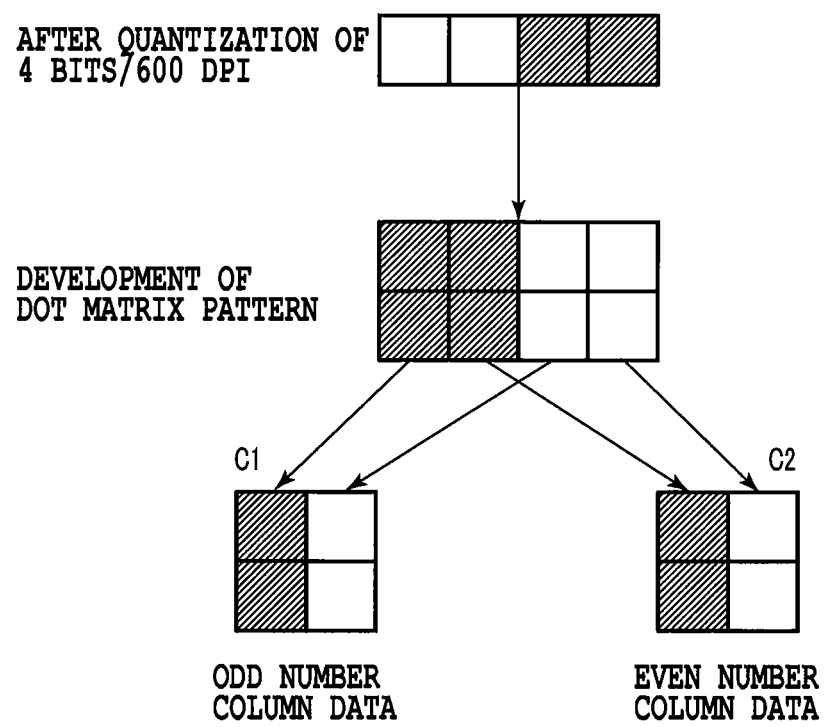
FIG. 8 is a schematic diagram for explaining one dot matrix pattern being selected and a method of developing it in a development buffer.

FIG. 8 is a schematic diagram for explaining the one dot matrix pattern being selected and a method of developing it in a development buffer. The dot pattern of (4 areas)×(2 areas) is sorted into odd-numbered areas and even-numbered areas with respect to the main scanning direction, which are developed in the development buffer 1004 and the development buffer 1005 as the odd number column data C1 and the even number column data C2, respectively. That is, binary data (1 or 0) corresponding to odd-numbered column areas of the dot matrix pattern is stored in the development buffer 1004, and binary data (1 or 0) corresponding to even-numbered column areas of the dot matrix pattern is stored in the development buffer 1005, respectively.

Referring to FIG. 6 again, at Step 5, the control part 500 determines whether a development processing of the dot matrix pattern is completed about all the pixels stored in the receive buffer 1001. If it determines that there remains a pixel that should be developed, the flow will returns to Step S2, and the control part 500 will perform the allocation processing of the dot matrix pattern to the next pixel. On the other hand, if it is determined that the development processing of the dot matrix pattern is completed for all the pixels stored in the receive buffer 1002, the control part 500 will complete this processing.

Figure 9:
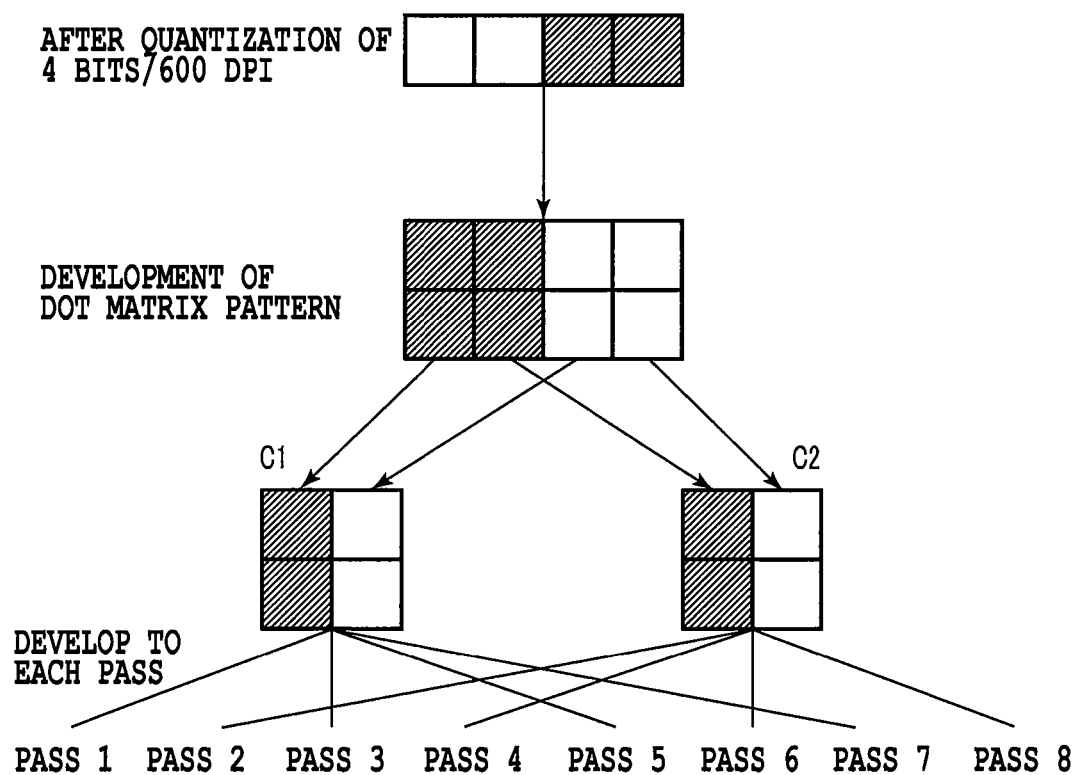
FIG. 9 is a diagram for explaining two development buffers and a printing scan of multipass printing in association with each other.

FIG. 9 is a diagram for explaining the two development buffers 1004 and 1005 and a printing scan of multipass printing in association with each other. In this embodiment, the odd number column data C1 stored in the development buffer 1004 is subsequently subjected to a logical product operation of itself and four masks that are in a mutually complementary relationship, and is distributed to pieces of the image data corresponding to four printing scans (for odd-numbered pass). On the other hand, the even number column data C2 stored in the development buffer 1005 is also subjected to a logical product between itself and four kinds of masks that are in a mutually complementary relationship, and is distributed to pieces of the image data corresponding to four printing scans (even-numbered pass). In addition, the odd number column data C1 and the even number column data C2 are printed one over another in mutually different printing scans (Pass 1 to Pass 8 (8th pass)). Concretely, they are printed so that the data of the first column and that of the second column may overlap mutually and so that the data of the third column and that of the fourth column may overlap mutually.

By the above configuration, in a unit area of the print medium, all the dots determined by the dot matrix pattern are stepwisely printed by eight printing scans (Pass 1 to Pass 8) of the printing head, and it becomes possible to print two dots in an individual area. Hereafter, the dots printed in a single area one over another in this way are called an overlapped dot.

The present inventors determined that it was possible to suppress density fluctuation when the print position shift occurs by appropriately allocating the scans that print two dots constituting such an overlapped dot.

Figure 10A:
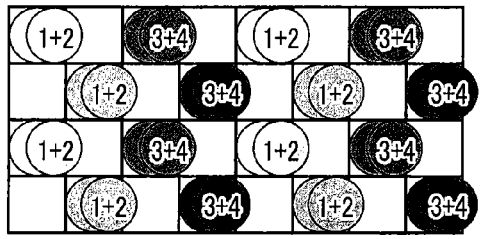
FIGS. 10A to 10F are schematic diagrams for explaining examples in each of which density fluctuation differs depending on a combination of two printing scans of printing an overlapped dot.
Figure 10D:
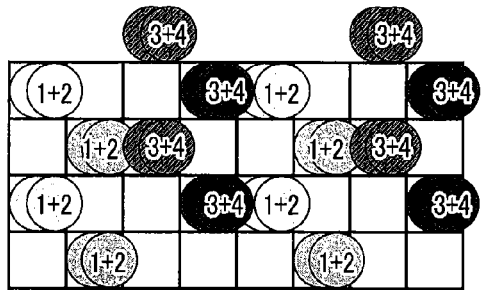
Figure 10B:
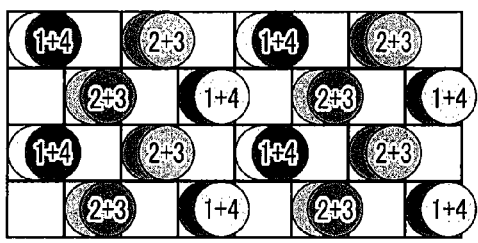
Figure 10E:
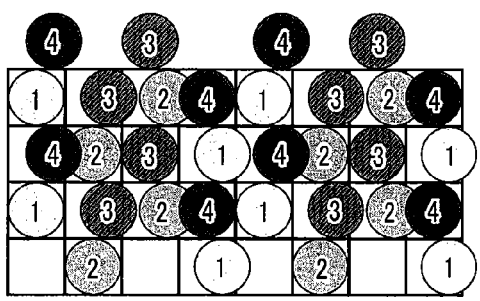
Figure 10C:
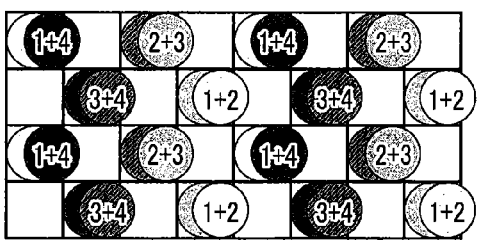

FIGS. 10A to 10F are schematic diagrams for explaining an example where the density fluctuation differs depending on a combination of two printing scans that print the overlapped dots. Here, an example where the overlapped dot is printed in an area of 50% by the multipass printing of four passes is shown. FIGS. 10A to 10C show an example where the overlapped dot is printed in every other area both longitudinally and horizontally. A numeral shown on the dot shows by which printing scan (pass) to this area the dot overlapped there is printed. That is, in an area at the upper left of FIG. 10A, it is shown that the dot is printed by the first printing scan (Pass 1) and the second printing scan (Pass 2), and in the same area of FIG. 10B, it is shown that the dot is printed by Pass 1 and Pass 4.

According to the figure, it turns out that although arrangements of the dots in FIGS. 10A to 10C are equal to one another, passes that prints the dot mutually differ. Concretely, in FIG. 10A, the printing is done either of the following: all the dots are overlapped by Pass 1 and Pass 2; or they are overlapped by Pass 3 (3rd pass) and Pass 4. In FIG. 10B, the printing is done either of the following: all the dots are overlapped by Pass 1 and Pass 4; or they are overlapped by Pass 2 and Pass 3. In contrast to this, in FIG. 10C, the following dots exist together: dots overlapped by Pass 1 and Pass 2; dots overlapped by Pass 1 and Pass 4; dots overlapped by Pass 2 and Pass 3; and further dots overlapped by Pass 3 and Pass 4.

Figure 10F:
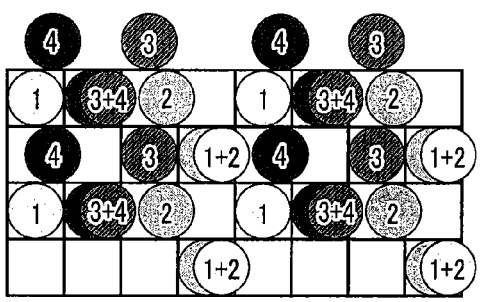

FIGS. 10D to 10F show the dot arrangements in the cases where conveyance conducted between Pass 2 and Pass 3 is shifted from the normal position by the amount of one area for each of FIGS. 10A to 10C. In this case, there occurs no shift between a dot group whose dots are printed by Pass 1 and a dot group whose dots are printed by Pass 2 and between a dot group whose dots are printed by Pass 3 and a dot group whose dots are printed by Pass 4.

Therefore, as in FIG. 10A, in the state where only the dot overlapped by Pass 1 and Pass 2 and the dot overlapped by Pass 3 and Pass 4 exist, even if the conveyance shift occurs, there will not occur any change in an overlapping relationship of the dot. However, the complementary relationship (spatial relationship) of the overlapped dots changes: the dots that are arranged in every other area both longitudinally and horizontally come adjacent to one another, or come partially to overlap one another. Therefore, the coverage ratio of the print medium reduces compared to that of FIG. 10A, and the blank area becomes conspicuous (refer to FIG. 10D). Although the case where all the dots were the overlapped dots was explained here, such a phenomenon is the same if the dot is a single dot. That is, if a sudden conveyance shift occurs and the arrangement relationship between the dots collapses from the arrangement state of high dispersibility and excellent uniformity, the blank area will become easily noticeable and the density of the area will tend to decrease.

On the other hand, like FIG. 10B, in the state where only the dot overlapped by Pass 1 and Pass 4 and the dot overlapped by Pass 2 and Pass 3 exist, if the conveyance shift occurs between Pass 2 and Pass 3, all the overlapped dots will be separated (refer to FIG. 10E). Therefore, as compared with the case of FIG. 10B where the dots are printed in every other area both longitudinally and horizontally, the blank areas decrease in number. That is, in the case of the dot arrangement as in FIG. 10B, if a sudden conveyance shift occurs, a density increase will occur by the overlapped dot being separated. Thus, in the state where all the overlapped dots are separated, the density increase by the separation of the overlapped dots exceeds a density reduction by a change of the complementary relationship among the dots.

In contrast to this, like FIG. 10C, in the state where the overlapped dots are printed in a combination of various passes, even if the conveyance shift occurs between Pass 2 and Pass 3, the dots that remain in the overlapping and the dots that get separated exist together (refer to FIG. 10F). As a result, neither as much a degree of the density reduction as that of FIG. 10D nor as much a degree of the density increase as that of FIG. 10E occurs, and a state of FIG. 10F is expected to maintain a density closest to the original image among FIGS. 10D to 10F.

From the above, with a configuration of printing an image including the overlapped dots, it is effective to suppress the density fluctuation that a combination of scans (passes) for printing the overlapped two dots is properly allocated. A multipass printing method to allocate the scan (pass) for printing the overlapped dot to various combinations will be explained comparing it with a conventional common multipass printing method.

Figure 11:
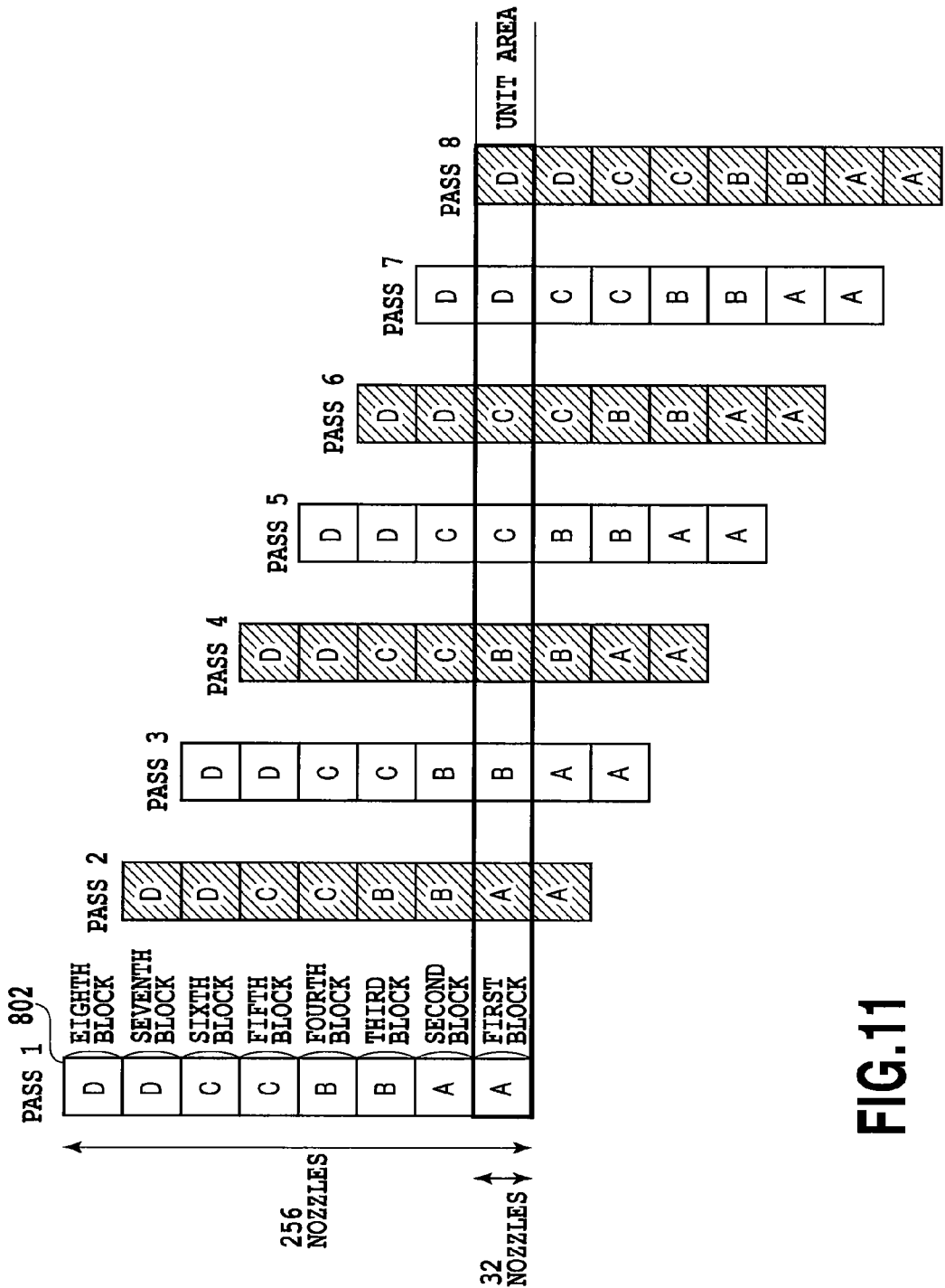
FIG. 11 is a schematic diagram for explaining a conventional common multipass printing method.

FIG. 11 is a schematic diagram for explaining a conventional common multipass printing method. Here, taking the multipass printing of eight passes as an example, there are shown a state of allocation of a mask to a nozzle row 802 of cyan and a spatial relationship of the nozzle row 802 and the unit area when an image of an unit area is being printed by eight printing scans.

The nozzle row 802 of cyan may be considered as 256 nozzles that are a sum of the even number nozzle row and the odd number nozzle row and are arranged at a pitch of 1200 dpi in the sub-scanning direction. In the multipass printing of eight passes, it is configured that these nozzle rows are divided into eight blocks each having 32 nozzles, and each nozzle block is allocated one of the masks A to D. Each of the masks A to D is defined so that printable (1) or non-printable (0) to each of the plurality of areas may be in an exclusive and complementary relationship, and a printable ratio (a ratio of printable areas to all the areas) of every mask is set to about 25%. In this example, the masks are allocated to the blocks as follows: a mask A to the first block and the second block; a mask B to the third block and the fourth block; a mask C to the fifth block and sixth block; and a mask D to the seventh block and the eighth block.

Each time individual printing scan is completed, the print medium is conveyed by one block (as many as 32 nozzles) in the sub-scanning direction. Therefore, in the unit area having a width as many as 32 nozzles, the printing is performed as follows: the odd number column data with the mask A is printed in Pass 1; the even number column data with the mask A in Pass 2; the odd number column data with the mask B in Pass 3; and the even number column data with the mask B in Pass 4. Moreover, the printing is performed as follows: the odd number column data with the mask C is printed in Pass 5; the even number column data with the mask C in Pass 6; the odd number column data with the mask D in Pass 7; and the even number column data with the mask D in Pass 8. In this specification, an area that is of the print medium corresponding to a width (32 nozzle width) of an individual block and on which the printing is going to be performed by the same printing scan with the same nozzle row is designated as the unit area.

In this example, since the same mask is used in two consecutive blocks, two dots constituting the overlapped dot are printed by two consecutive printing scans. Moreover, since the masks A to D have a mutually exclusive and complementary relationship, the whole of the odd number column data is printed by four odd number passes using the masks A to D. Furthermore, the whole of the even number column data is printed by four even number passes using the masks A to D.

Incidentally, since the printing scan for the odd number column data and the printing scan for the even number column data are performed alternately, there are some unit areas where the odd number column data is printed in Pass 1, and there are some unit areas where the even number column data is printed in Pass 1.

Figure 14:
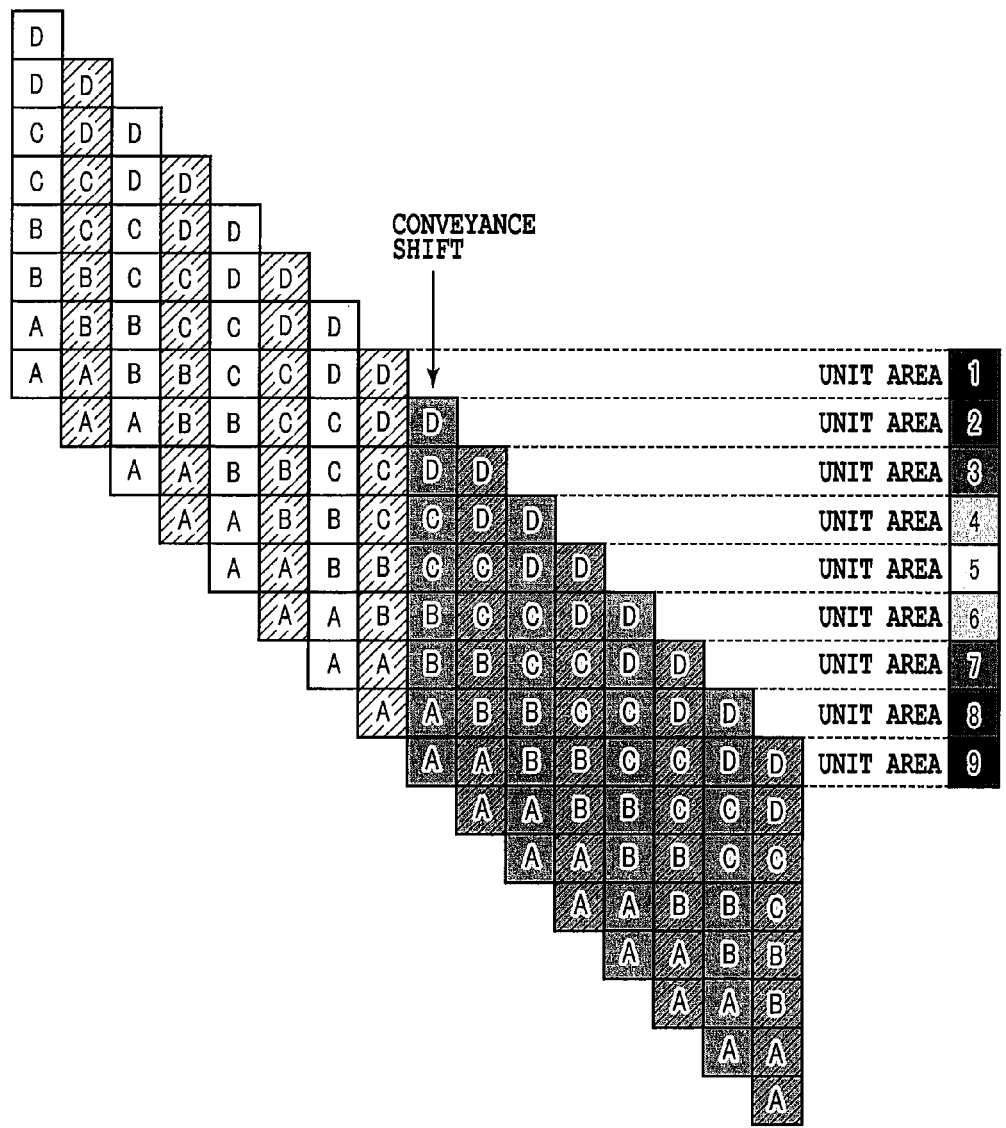
FIG. 14 is a diagram for explaining an occurrence state of the density fluctuation when a conveyance shift occurs in one certain conveyance operation in the case where a conventional common mask explained in FIG. 11 was used.

FIG. 14 is a diagram for explaining an occurrence state of the density fluctuation when the conveyance shift occurred in one certain conveyance operation in the case where the conventional common mask explained by FIG. 11 was used. Here, assume a case where the conveyance shift occurred in the conveyance operation performed just before the printing scan designated by an arrow. The unit areas 1 to 9 show the unit area in which the printing scan (pass) is performed straddling the above-mentioned conveyance shift, and unit areas that are adjacent to this.

Here, a unit area 1 is an area (normal area) in which the printing scans were performed without straddling the conveyance operation in which the conveyance shift occurred.

A unit area 2 is an area in which the conveyance shift occurred between Pass 7 and Pass 8, and print positions of Pass 8 are shifted relative to print positions of Pass 1 to Pass 7 (a print position shift of 1/8 pass).

A unit area 3 is an area in which the conveyance shift occurred between Pass 6 and Pass 7, and print positions of Pass 7 and Pass 8 are shifted relative to print positions of Pass 1 to Pass 6 (a print position shift of 2/8 pass).

A unit area 4 is an area in which the conveyance shift occurred between Pass 5 and Pass 6, and print positions of Pass 6 to Pass 8 are shifted relative to print positions of Pass 1 to Pass 5 (a print position shift of 3/8 pass).

A unit area 5 is an area in which the conveyance shift occurred between Pass 4 and Pass 5, and print positions of Pass 5 to Pass 8 are shifted relative to print positions of Pass 1 to Pass 4 (a print position shift of 4/8 pass).

A unit area 6 is an area in which the conveyance shift occurred between Pass 3 and Pass 4, and print positions of Pass 4 to Pass 8 are shifted relative to print positions of Pass 1 to Pass 3 (a print position shift of 5/8 pass, i.e., 3/8 pass).

The unit area 7 is an area in which the conveyance shift occurred between Pass 2 and Pass 3, and print positions of Pass 3 to Pass 8 are shifted relative to print positions of Pass 1 and Pass 2 (a print position shift of 6/8 pass, i.e., 2/8 pass).

The unit area 8 is an area in which the conveyance shift occurred between Pass 1 and Pass 2, and print positions of Pass 2 to Pass 8 shifted relative to print positions of Pass 1 (a print position shift of 7/8 pass i.e., 1/8 Pass).

The unit area 9 is an area (normal area) in which the printing scans were performed without straddling the conveyance operation in which the conveyance shift occurred.

That is, if there is one conveyance operation in which the conveyance shift occurs, in the case of the multipass printing of eight passes, its influence exerts to seven unit areas, and in the case of the multipass printing of 2M passes, it exerts to (2M−1) unit areas.

Figure 15:
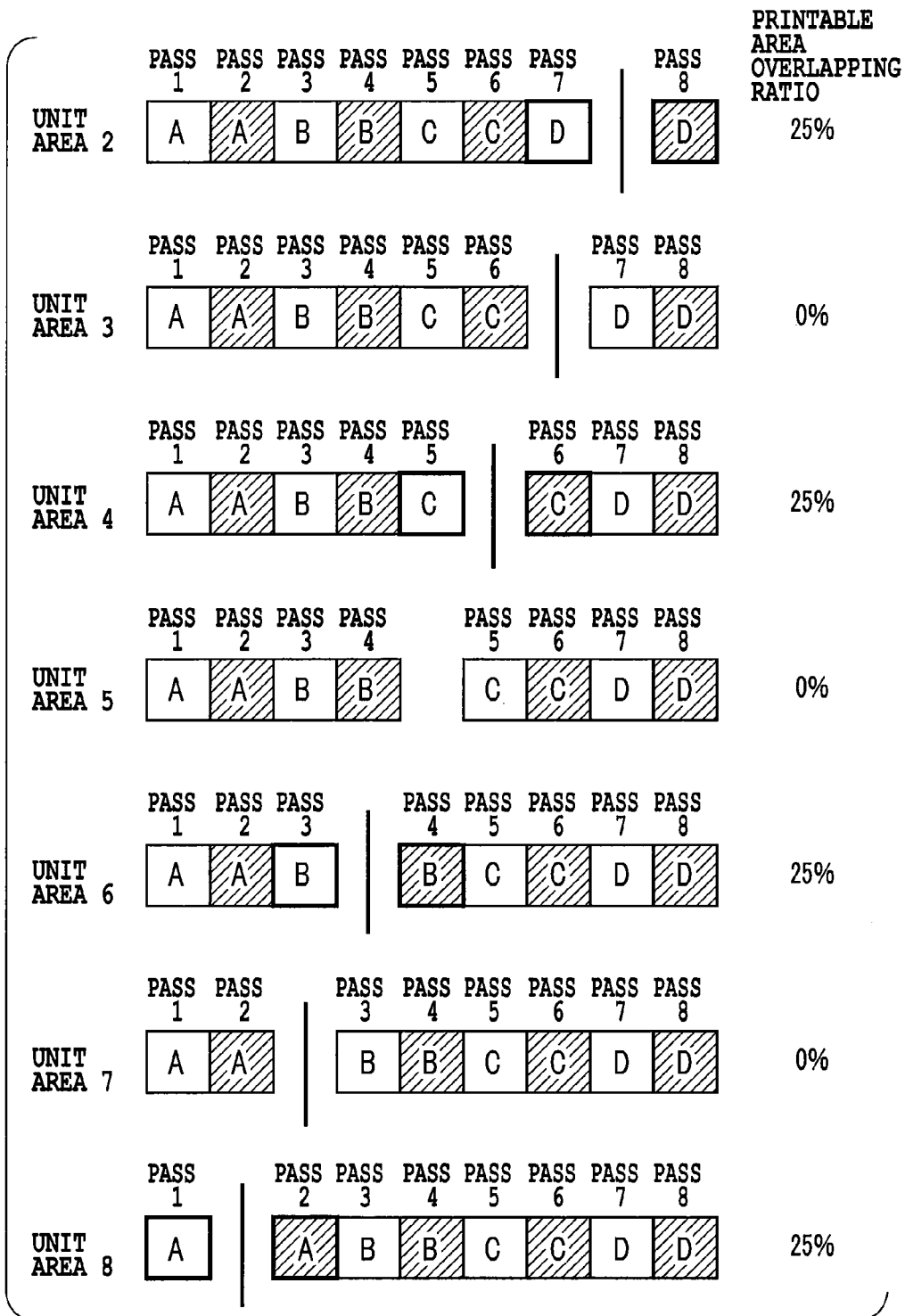
FIG. 15 is a diagram for, about seven areas to which an influence of the conveyance shift exerts, explaining a state of overlapping and separation of each dots comparing it with those of FIGS. 10A to 10C.

FIG. 15 is a diagram for explaining a state of overlapping and separation of each dot about seven areas (the unit areas 2 to 8) to which the above-mentioned conveyance shift exerts, comparing it with those of FIGS. 10A to 10C. First, about the unit area 2, 25% of the overlapped dots printed with the mask D is separated like FIG. 10E by the conveyance shift having occurred between Pass 7 and Pass 8. This situation is the same also in the unit area 8.

In the unit area 3, the overlapped dots are not separated by the conveyance shift having occurred between Pass 6 and Pass 7. Meanwhile, since the overlapped dots printed with the mask D shift relative to the overlapped dots printed with the masks A, B, and C, the complementary relationship of these masks collapses, the blank area emerges as shown in FIG. 10D, and therefore the density reduction is anticipated. This situation is the same also in the unit area 7.

In the unit area 4, 25% of the overlapped dots printed with the mask C is separated as shown in FIG. 10E by the conveyance shift having occurred between Pass 5 and Pass 6. Since on the other hand, the complementary relationship of the dots printed with the mask A and the mask B and the dots printed with the mask D collapses, the density reduction is also anticipated. This situation is the same also in the unit area 6.

In the unit area 5, the overlapped dots are not separated by the conveyance shift having occurred between Pass 4 and Pass 5. On the other hand, 50% of the overlapped dots printed with the mask C and the mask D will shift relative to 50% of the overlapped dots printed with the mask A and the mask B. Collapse of the complementary relationship at this time will be larger than those of the unit area 3 and the unit area 7 where 25% of the overlapped dots shift. Therefore, the unit area 5 is the unit area whose density reduction is most anticipated among all the unit areas 2 to 8 to which an influence of the conveyance shift exerts.

Although the multipass printing of eight passes is explained as an example here, generally when performing the multipass printing of 2M passes, the unit area in which the conveyance shift occurred between the M-th printing scan and the (M+1)th printing scan becomes the unit area in which the largest density reduction is anticipated. In this specification, such an interval between Pass M (M-th printing scan) and Pass M+1 (M+1-th printing scan) will be called "the central interval of passes".

In order to improve such a situation, what is necessary is to configure such that in the unit area in which the density reduction is most anticipated (the unit area 5), the dots of the odd number column data and the dots of the even number column data in the same area are printed straddling as much as possible the conveyance operation in which the conveyance shift occurs. In other words, if for all the unit areas, it is configured such that as many overlapped dots as possible are printed straddling the conveyance operation that is performed between Pass M and Pass M+1, it is expected that the density reduction is mitigated whenever timing of the conveyance shift occurs. Then, what is necessary for that purpose is that a ratio of areas in which printing is permitted in any one of the masks used in Pass 1 to Pass M and any one of the masks used in Pass M+1 and the later passes to all the areas included in the unit areas (a printable area overlapping ratio) should be set high.

In the case where a conventional mask shown by FIG. 11 was used, in the multipass printing of eight passes (2M), the printable area overlapping ratio that relates to straddling between Pass 4 and Pass 5 (Pass M and Pass M+1) is 0% as seen in the unit area 5 of FIG. 15. For this reason, when the conveyance shift occurred between Pass 4 and Pass 5, a large density reduction was brought about in the unit area.

Figure 12:
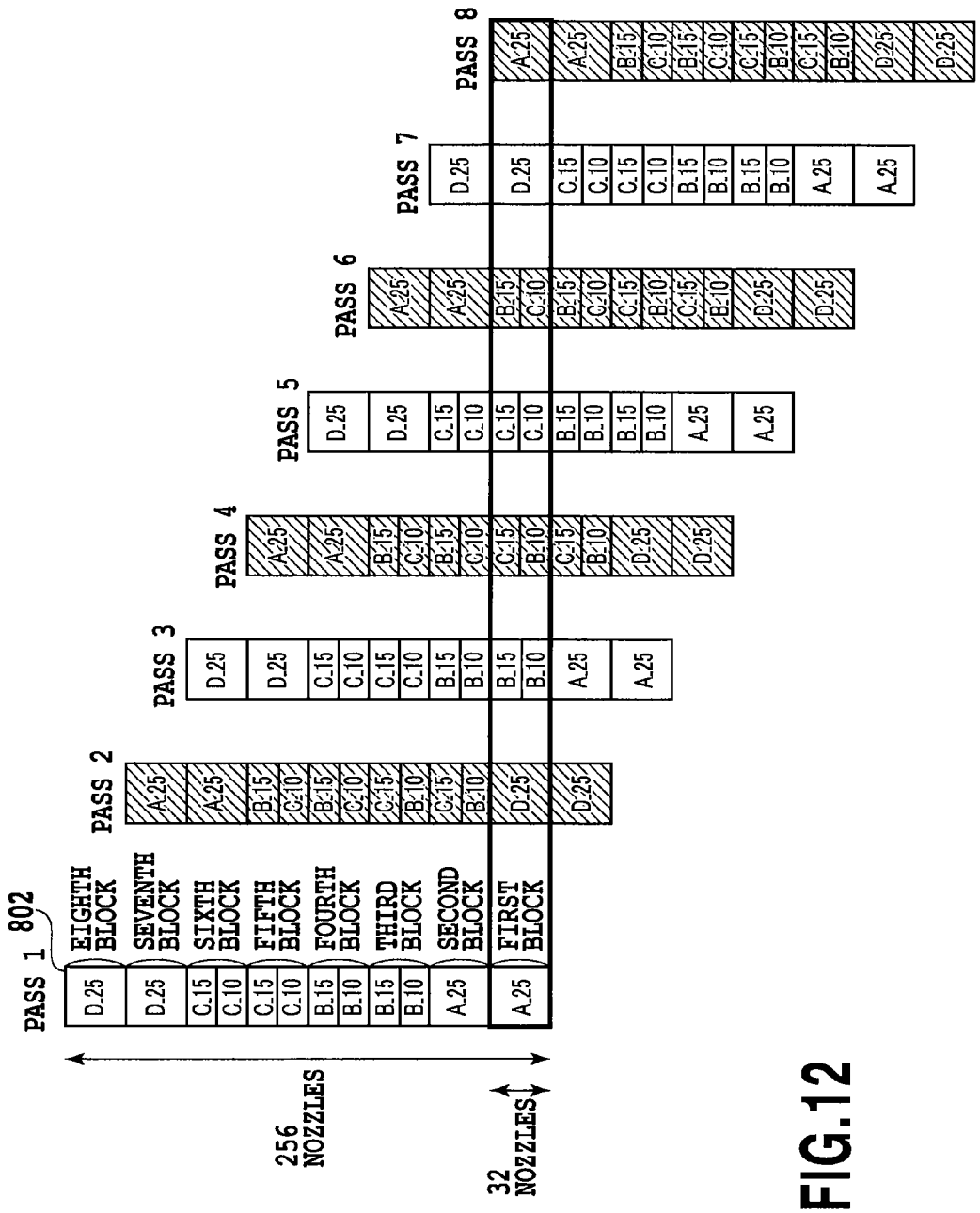
FIG. 12 is a schematic diagram for explaining the multipass printing method that is applied to an embodiment of the present invention, comparing it with that of FIG. 11.

FIG. 12 is a schematic diagram for explaining the multipass printing method using the mask according to this embodiment that was formed so as to fulfill the above-mentioned condition, comparing it with that of FIG. 11. Also in this embodiment, as masks, four masks A to D whose printable ratios are almost 25% and that are in the mutually complementary relationship are prepared.

In this embodiment, in the printing scan for printing the odd number column data and in the printing scan for printing the even number column data, masks allocated to respective blocks are differentiated from each other.

Regarding the printing scan for printing the odd number column data (in the figure, the odd number pass), the mask A is allocated to the first block and the second block, and the mask B is allocated to the third block and the fourth block. Moreover, the mask C is allocated to the fifth block and the sixth block, and the mask D is allocated to the seventh block and the eighth block, respectively. In the figure, a mask A_25 is a representation method of simultaneously indicating the kind of the mask and the printable ratio, showing the same mask as the mask A shown in FIG. 11. Moreover, a mask B_15 and a mask B_10 show portions of the mask B shown in FIG. 11, respectively. For example, the second block is considered to be allocated a mask B_25 of a print ratio of 25% that is a sum of the mask B_15 of a printable ratio of 15% and the mask B_10 of a printable ratio of 10%, and becomes the same as the mask B shown in FIG. 11. This situation is the same also with the masks C and D.

In contrast to this, regarding the printing scan for printing the even number column data (in the figure, an even number pass), a mask D_25 is allocated to the first block and the second block, and the mask B_10 and a mask C_15 are allocated to the third block and the fourth block. Moreover, the mask B_15 and a mask C_10 are allocated to the fifth block and the sixth block, and the mask D_25 is allocated to the seventh block and the eighth block, respectively.

Figure 13:
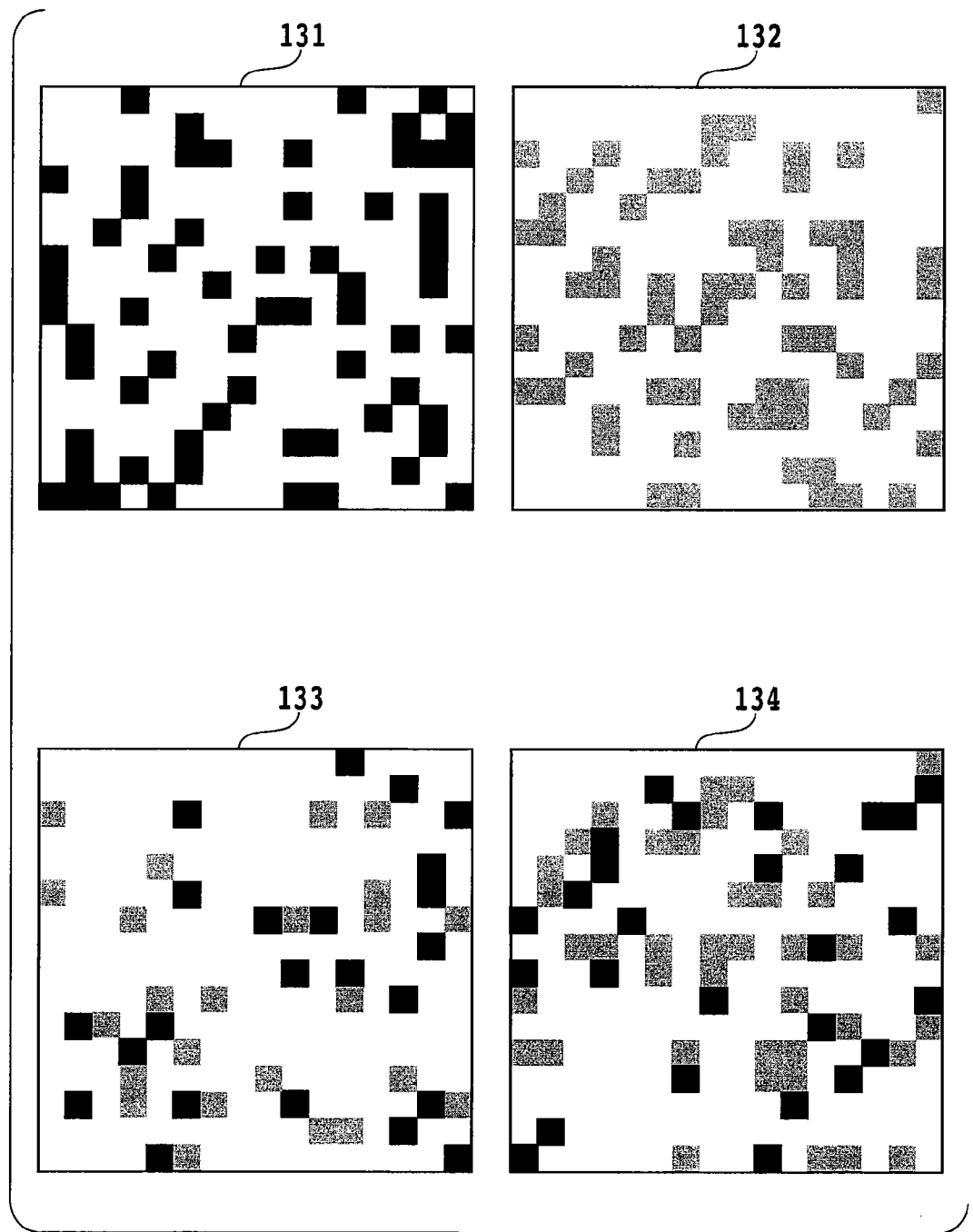
FIG. 13 is a diagram for explaining a new mask synthesized from two kinds of a mask B and a mask C, like masks that are allocated to the third block to the sixth block in an even number pass.

FIG. 13 is a diagram for explaining a new mask synthesized from two kinds of the mask B and the mask C like the mask that is allocated to the third block to the sixth block in the even number pass. In the figure, a small graphic 131 is a diagram showing one region (16×16 areas) of the mask B_25. In this figure, the area that is painted out black indicates a printable area. In the mask B_25, the printable area corresponds to 25% of all the areas. On the other hand, a small graphic 132 shows a mask C_25 corresponding to the same region as those of the above-mentioned small graphic 131. Also in the small graphic 132, the printable area corresponds to 25% of all the areas.

In contrast to this, a small graphic 133 shows a state where 10% of the printable areas out of 25% of the printable areas of the mask C_25 were replaced with 10% of the printable areas of the mask B_25. Since the mask B_25 and the mask C_25 are exclusive masks to each other, even if the printable areas are replaced with each other, the printable areas do not overlap. This new mask 133 is allocated to the third block and the fourth block in the even number pass.

Moreover, a small graphic 134 shows a state where 10% of the printable areas out of 25% of the printable areas of the mask B_25 is replaced with 10% of the printable areas of the mask C_25. This new mask 134 is allocated to the fifth block and the sixth block in the even number pass. Since the mask shown in the small graphic 133 and the mask shown in the small graphic 134 are generated by replacing portions of the mask B_25 and the mask C_25 with each other, an exclusive relationship also stands between these two. Then a mask of a printable ratio of 50% that is obtained by summing these agrees with a result obtained by summing the mask B_25 shown in the small graphic 131 and the mask C_25 shown in the small graphic 132.

Figure 16:
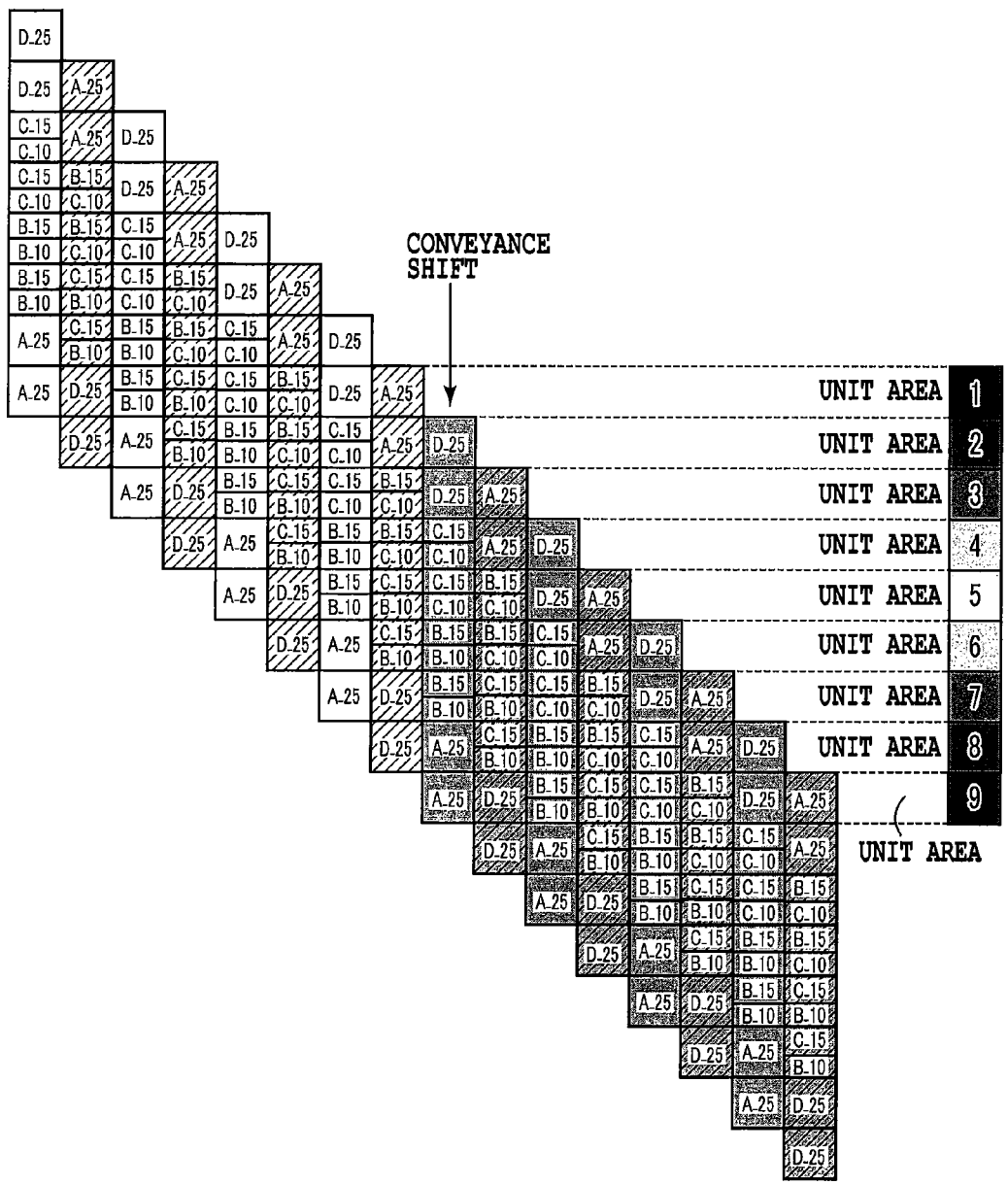
FIG. 16 is a diagram for explaining a state of density variation when the conveyance shift occurs in one certain conveyance operation in the case where the mask of the first embodiment is used.

FIG. 16 is a diagram for explaining a state of density variation when the conveyance shift occurs in one certain conveyance operation in the case of using the mask according to this embodiment explained in FIG. 12. This figure shows a case where the conveyance shift occurred in the conveyance operation performed just before a pass (printing scan) designated by an arrow. The unit areas 1 to 9 show areas in which the printing scans (pass) are performed straddling the above-mentioned conveyance shift, and the unit areas that are adjacent to this.

Figure 17:
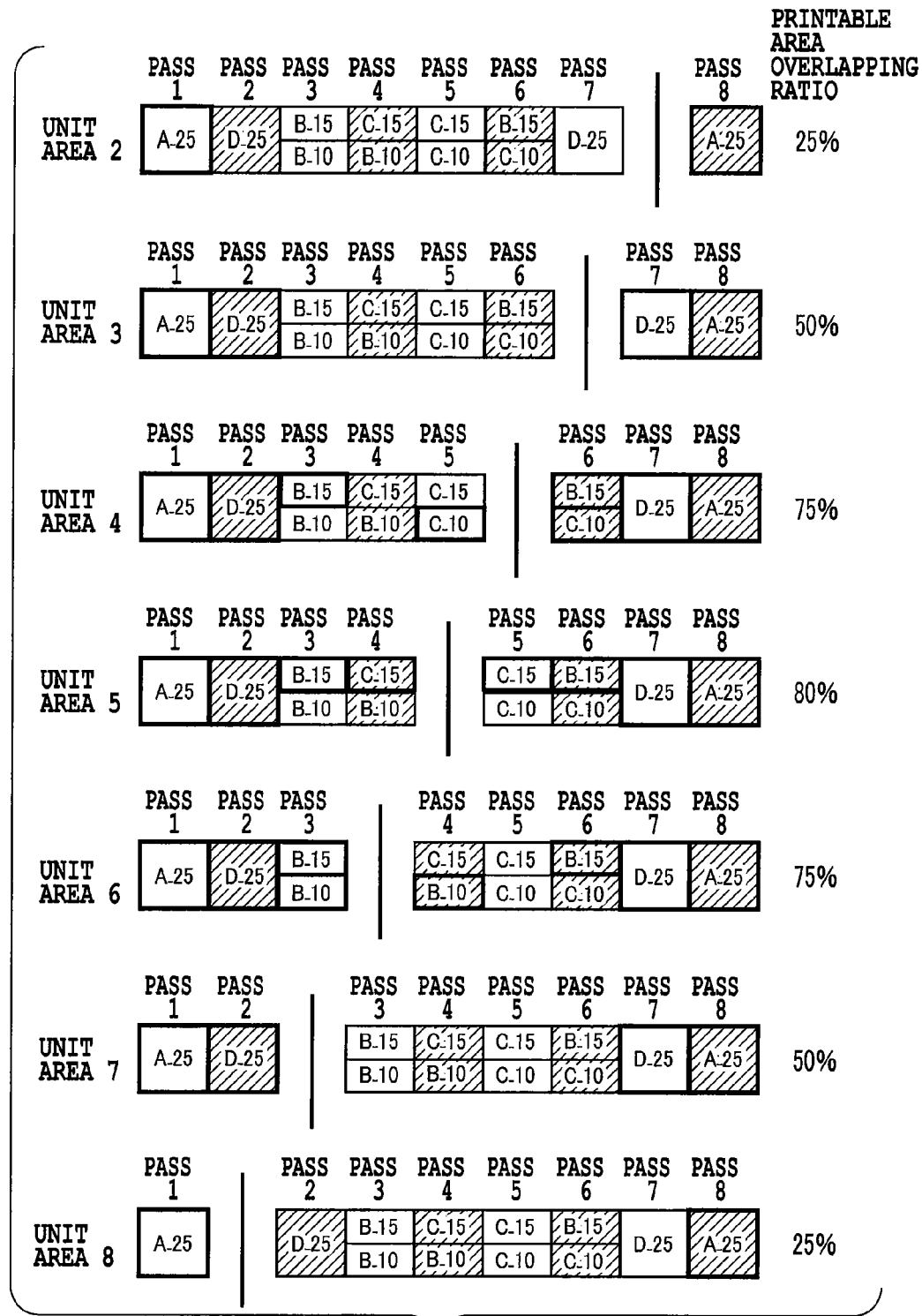
FIG. 17 is a diagram showing a case where Pass 1 (1st pass) is the printing scan for odd number column data.
Figure 18:
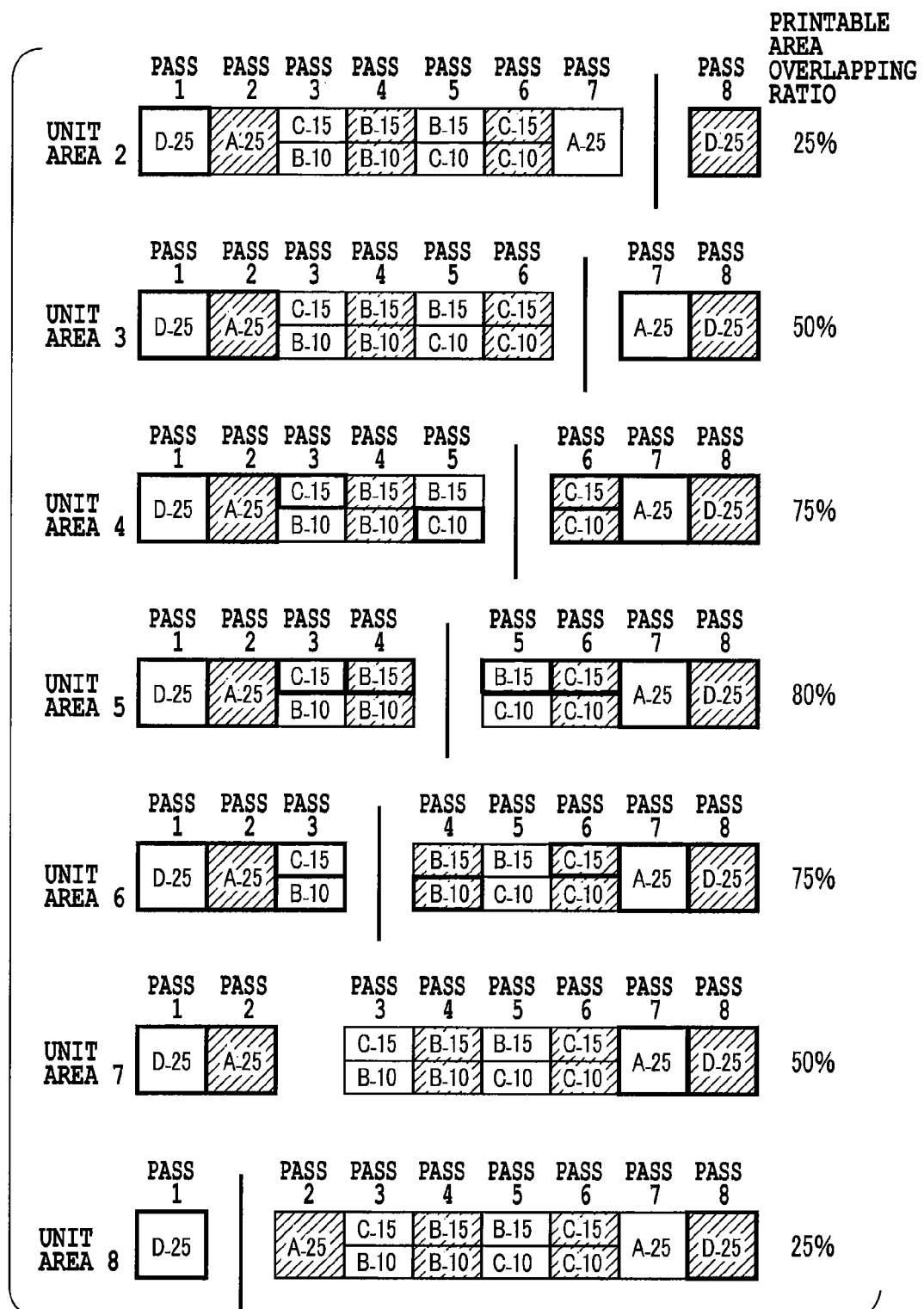
FIG. 18 is a diagram showing a case where Pass 1 is the printing scan for even number column data.

FIG. 17 and FIG. 18 are diagrams for explaining a state of overlapping or separation of each dot in each of seven areas (unit areas 2 to 8) to which the influence of the conveyance shift exerts, comparing it with FIGS. 10A to 10C. FIG. 17 shows the case where Pass 1 is the printing scan for the odd number column data; FIG. 18 shows the case where Pass 1 is the printing scan for the even number column data.

In FIG. 17, in the unit area 2, the conveyance shift having occurred between Pass 7 and Pass 8 separates the overlapped dots printed with the mask A. That is, since the printable area overlapping ratio that relates to straddling between Pass 7 and Pass 8 is 25%, 25% of the whole overlapped dots is separated. This situation is the same also in the unit area 8.

In the unit area 3, the conveyance shift having occurred between Pass 6 and Pass 7 separates the overlapped dots printed with the mask A and the overlapped dots printed with the mask D, respectively. That is, since the printable area overlapping ratio that relates to straddling between Pass 6 and Pass 7 is 25%+25%=50%, 50% of the whole overlapped dots is separated. This situation is the same also in the unit area 7.

In the unit area 4, the conveyance shift having occurred between Pass 5 and Pass 6 separates the following overlapped dots: the overlapped dots printed with the mask A, the overlapped dots printed with the mask D, the overlapped dots printed with the mask B_15, and the overlapped dots printed with the mask C_10. That is, since the printable area overlapping ratio that relates to straddling between Pass 5 and Pass 6 is 25%+25%+15%+10%=75%, 75% of the whole overlapped dots is separated. This situation is the same also in the unit area 6.

Furthermore, in the unit area 5, the conveyance shift between Pass 4 and Pass 5 separates the following overlapped dots: the overlapped dots printed with the mask A; the overlapped dots printed with the mask D; the overlapped dots printed with the mask B_15; and the overlapped dots printed with the mask C_15. That is, since the printable area overlapping ratio that relates to straddling between Pass 4 and Pass 5 is 25%+25%+15%+15%=80%, 80% of the whole overlapped dots is separated.

Thus, with the masks of this embodiment, the printable area overlapping ratio that relates to straddling between Pass 4 and Pass 5 is 80%, which is a sufficiently high value compared to 60% of the conventional method explained in FIG. 15. Therefore, even in the unit area in which the largest density reduction is anticipated when the conveyance shift occurred between Pass 4 and Pass 5, it is possible to mitigate the density reduction. Moreover, this embodiment is configured so that, while the printable area overlapping ratio that relates to straddling between Pass 4 and Pass 5 is set high, the printable area overlapping ratio that relates to straddling between other consecutive passes may decrease stepwisely from that between the Pass 4 and Pass 5. By adopting such a configuration in advance, it becomes possible to suppress the density reduction by the conveyance shift to an appropriate quantity for all the unit areas.

Incidentally, the printable area overlapping ratio that relates to straddling between Pass 4 and Pass 5 can also be varied by adjusting a method of forming a mask explained in FIG. 13. For example, in FIG. 13, although a configuration such that 10% of the printable areas of the mask B_25 and the mask C_25 are replaced to each other is used, it becomes possible to set the printable area that relates to straddling between Pass 4 and Pass 5 to 90% by changing the above-mentioned 10%, for example, to 5%. Moreover, if the following allocation of the masks is used, it will alsobecome possible to set the printable area overlapping ratio that relates to straddling between Pass 4 and Pass 5 to 100%.

Figure 19:
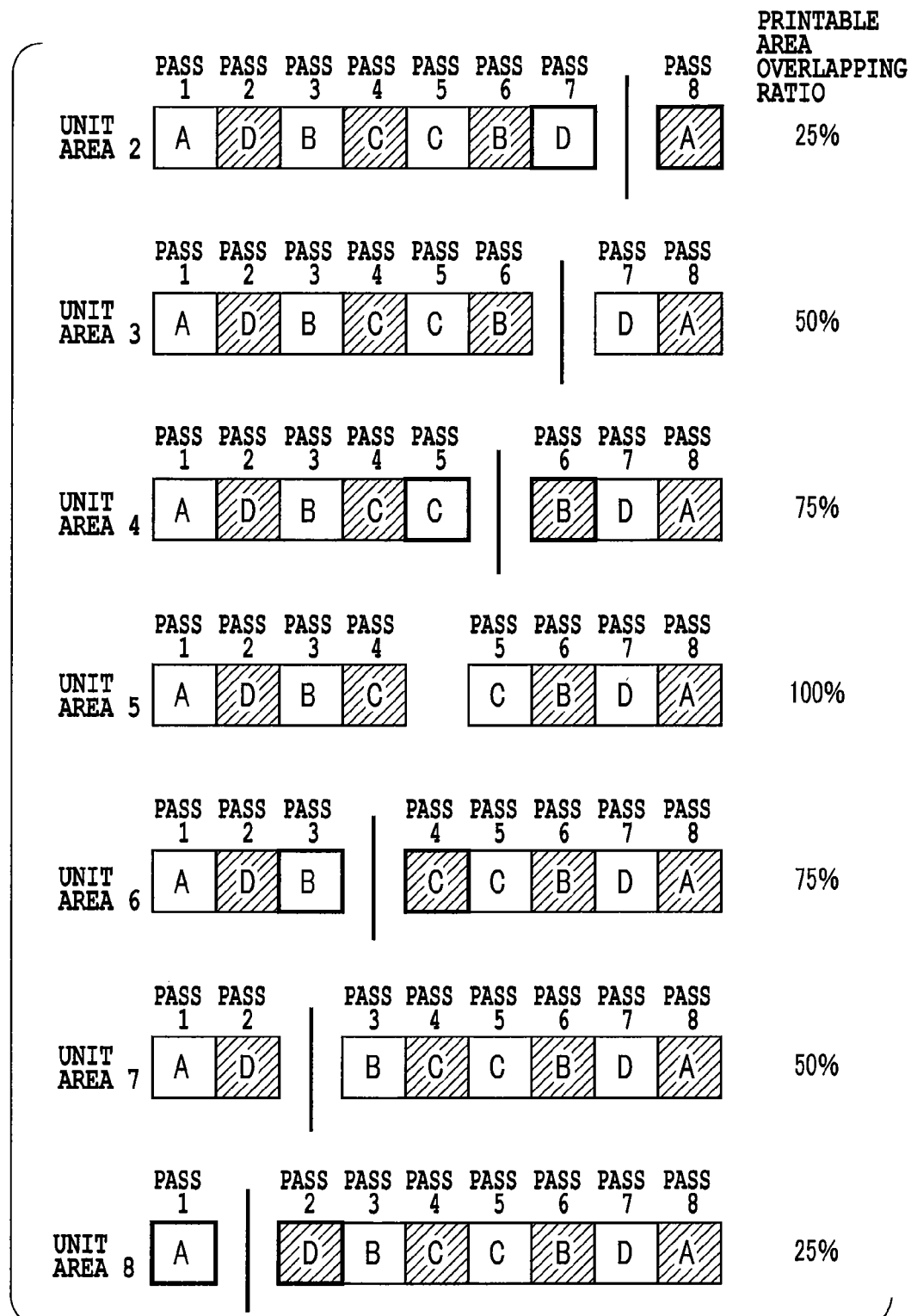
FIG. 19 is a diagram showing an example where a printable area overlapping ratio of 100% is realized between Pass 4 (4th pass) and Pass 5 (5th pass), similarly with the cases of FIG. 17 and FIG. 18.

FIG. 19 is a diagram showing an example where the printable area overlapping ratio that relates to straddling between Pass 4 and Pass 5 is set to 100%, similarly with FIG. 17 and FIG. 18.

In this figure, in the unit area 2, the overlapped dots printed with the mask A are separated by the conveyance shift having occurred between Pass 7 and Pass 8. That is, since the printable area overlapping ratio that relates to straddling between Pass 7 and Pass 8 is 25%, 25% of the whole overlapped dots are separated. This situation is the same also in the unit area 8.

In the unit area 3, the overlapped dots printed with the mask A and the overlapped dots printed with the mask D are separated, respectively, by the conveyance shift having occurred between Pass 6 and Pass 7. That is, since the printable area overlapping ratio that relates to straddling between Pass 7 and Pass 8 is 25%+25%=50%, 50% of the whole overlapped dots is separated.

In the unit area 4, the conveyance shift having occurred between Pass 5 and Pass 6 separates the overlapped dots printed with the mask A, the overlapped dots printed with the mask D, and the overlapped dots printed with the mask B, respectively. That is, since the printable area overlapping ratio that relates to straddling between Pass 5 and Pass 6 is 25%+25%+25%=75%, 75% of the whole overlapped dots is separated. This situation is the same also in the unit area 6.

Furthermore, in the unit area 5, the conveyance shift having occurred between Pass 4 and Pass 5 separates the overlapped dots printed with the mask A, the overlapped dots printed with the mask D, the overlapped dots printed with the mask B, and the overlapped dots printed with the mask C, respectively. That is, since the printable area overlapping ratio that relates to straddling between Pass 4 and Pass 5 is 25%+25%+25%+25%=100%, 100% of the whole overlapped dots is separated.

Figure 20:
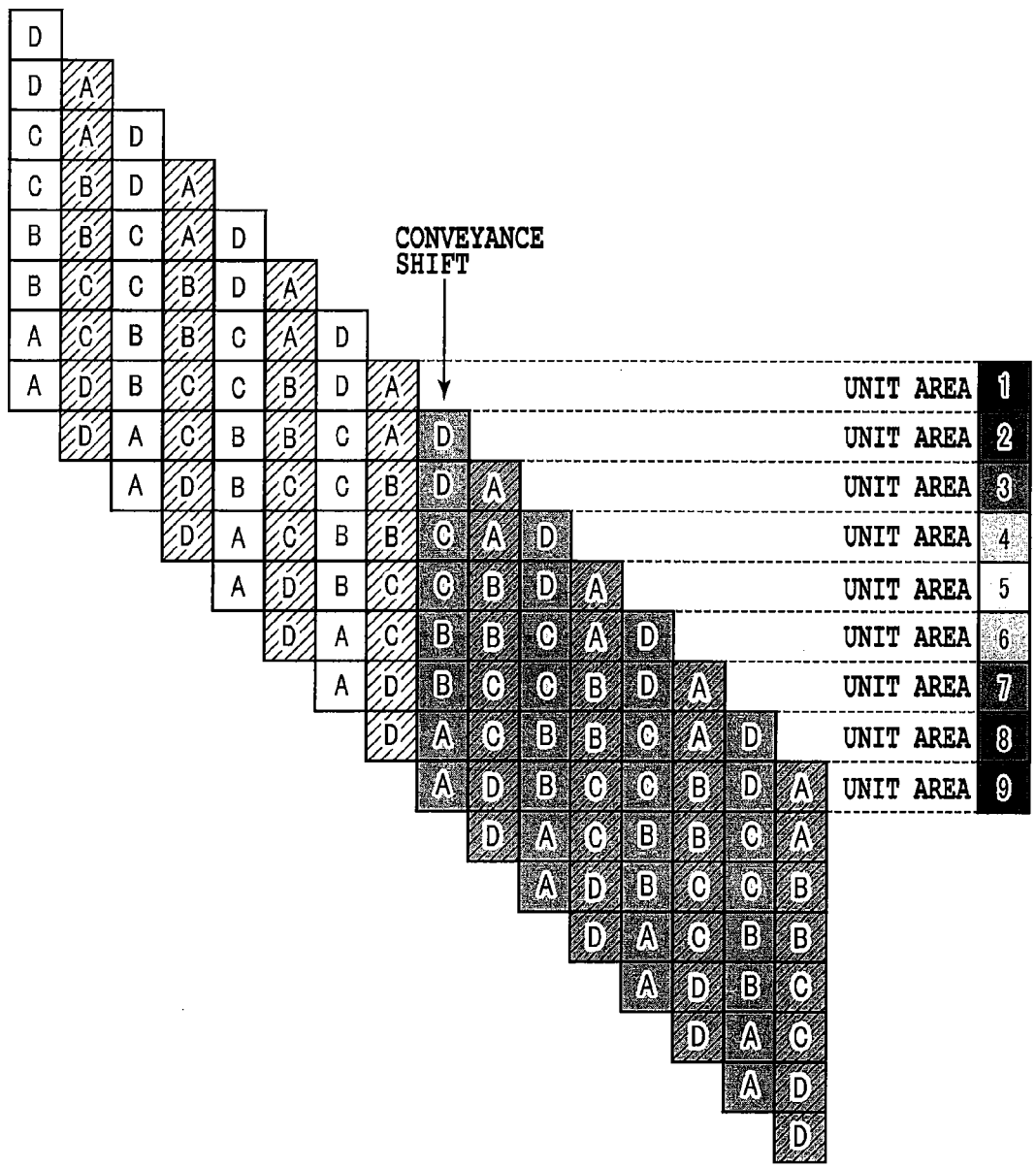
FIG. 20 is a diagram for explaining an image ill effect in the case where the printable area overlapping ratio is set to a value high more than necessary.

Thus, by adopting the allocation of the masks shown in FIG. 19, it is possible to realize the printable area overlapping ratio of 100% between Pass 4 and Pass 5. However, the printable area overlapping ratio should just be a degree that suppresses the density reduction by the conveyance shift, and if it is a higher value than needed, there arises a possibility that the density becomes higher than that in the normal area, as shown in FIG. 20. Therefore, in this embodiment, it is desired that the printable area overlapping ratio that relates to straddling between two consecutive passes is appropriately adjusted by adjusting a method of creating a new mask and allocation of masks.

As explained above, according to this embodiment, when performing the multipass printing of 2M passes, a mask such that the printable area overlapping ratio that relates to straddling between Pass M and Pass M+1 is set higher than the printable area overlapping ratio that relates to straddling between other two consecutive passes. By this setting, even in the case where a sudden conveyance shift etc. collapses the complementary relationship of the dots and the density reduction is anticipated, by separation of the dots of the first column data and the dots of the second column data, increase of the density is quickened, and it is possible to mitigate the density reduction. Moreover, it is also possible to realize separation of the dots by a degree suitable to a degree of the anticipated density reduction by adjusting the printable area overlapping ratio.

Incidentally, in this embodiment, "a printable area overlapping ratio that relates to straddling between Pass M and Pass M+1" means a ratio of the printable areas in which printing is permitted both by passes performed before M+1 and by passes performed after M. Moreover, "a printable area overlapping ratio that relates to straddling between another two consecutive passes" means, defining N as an integer number differing from M, a ratio of the printable areas in which printing is permitted both by passes performed before Pass N+1 and by passes performed after Pass N. For example, in the case of FIG. 19, M is 4. Then, an area in which printing is permitted with Mask A by Pass 1 should be permitted to be printed in with Mask A by Pass 8, and an area in which printing is permitted with Mask D by Pass 2 should be permitted to be printed in with Mask D by Pass 7. In a similar way, an area in which printing is permitted with Mask B by Pass 3 should be permitted to be printed in with Mask B by Pass 6, and an area in which printing is permitted with Mask C by Pass 4 should be permitted to be printed in with Mask C by Pass 5. That is, in the case of FIG. 19, since printing is permitted to all areas both by any one of Pass 1 to Pass 4 and by any one of the Pass 5 to Pass 8, a ratio of the printable areas in which printing is permitted both by passes performed before Pass 5 and by passes performed after Pass 4 is 100%.

Furthermore, considering a case in which N=3 for example regarding the FIG. 19, an area which is permitted to be printed in with Mask A by Pass 1 performed before Pass 4 should be permitted to be printed in with Mask A by Pass 8 performed after Pass 3 and an area which is permitted to be printed in with Mask D by Pass 2 performed before Pass 4 should be permitted to be printed in with Mask D by Pass 7 performed after Pass 3. Moreover, an area which is permitted to be printed in with Mask B by Pass 3 should be permitted to be printed in with Mask B by Pass 6 performed after Pass 3.

However, an area which is permitted to be printed in with Mask C by Pass 4 and Pass 7 is an area which is permitted to be printed in by only passes performed after Pass 3. Therefore, this area does not correspond to an area in which printing is permitted both by passes performed before Pass N+1 and by passes performed after Pass N. Therefore, if N=3, a ratio of the printable area in which printing is permitted both by passes performed before Pass N+1 and by passes performed after Pass N is 75%. Even if N is other integer number, a ratio of the printable area in which printing is permitted both by passes performed before Pass N+1 and by passes performed after Pass N is smaller than 100%.

In this way, the mask of this embodiment has a feature wherein a ratio of the printable areas in which printing is permitted both by passes performed before Pass M+1 and by passes performed after Pass M is larger than a ratio of the printable areas in which printing is permitted both by passes performed before Pass N+1 and by passes performed after Pass N. By this, when a complementary relationship of dots collapses due to a sudden conveyance shift etc., the density reduction can be mitigated by separating of overlapped dots.

The mask is configured so that for all combinations of S and T, a difference between a ratio of the print permitted dot areas in which printing is permitted both by scans performed before Scan (S+1) and by scans performed after Scan S and a ratio of the print permitted dot areas in which printing is permitted both by scans performed before Scan S+2 and by scans performed after Scan (S+1), is different from a difference between a ratio of the print permitted dot areas in which printing is permitted both b scans performed before Scan (T+1) and by scans performed after Scan T and a ratio of the print permitted dot areas in which printing is permitted both by scans performed before Scan (T+2) and by scans performed after Scan (T+1). Suppose in the foregoing example that S=3 and T=1. A ratio of the printable areas permitted both by before Pass 4 (that is, Pass 1 to Pass 3) and by after Pass 3 (that is, Pass 4 to Pass 8) is 75%, and a ratio of the printable areas permitted both by before Pass 5 (that is, Pass 1 to Pass 4) and by after Pass 4 (that is, Pass 5 to Pass 8) is 80%. That is a difference of 80%-75%=5%. On the other hand, a ratio of the printable areas permitted both by before Pass 2 (that is, Pass 1) and by after Pass 1 (that is, Pass 2 to Pass 8) is 25%, and a ratio of the printable areas permitted both by before Pass 3 (that is, Pass 1 to Pass 2) and by after Pass 2 (that is, Pass 3 to Pass 8) is 50%. That is a difference of 50%–25%=25%. The values of differences (5% and 25%) are different from each other.

Furthermore, it is another feature of this embodiment that, when the printable area overlapping ratio decrease stepwisely from the central interval of passes, a difference of the printable area overlapping ratio between adjusting two unit areas becomes smaller as the position closes in the central interval of passes. For FIGS. 17 and 18, the printable area overlapping ratio that relates to straddling between passes performed before Pass 4 and passes performed after Pass 3 and that relates to straddling between passes performed before Pass 6 and passes performed after Pass 5 are 75%, the printable area overlapping ratio that relates to straddling between passes performed before Pass 5 and passes performed after Pass 4 is 80%, and their difference is 5%. On the other hand, the printable area overlapping ratio that relates to straddling between passes performed before Pass 2 and passes performed after Pass 1 is 25%, the printable area overlapping ratio that relates to straddling between passes performed before Pass 3 and passes performed after Pass 2 is 50%, and their difference is 25%. By this way, in this embodiment, when the printable area overlapping ratio decreases step-wisely from the central interval of passes, a difference of the printable area overlapping ratio between adjusting two unit areas becomes smaller as the position closes in the central interval of passes. By this construction, in a unit area where large density reduction is anticipated such as the unit area 4 to 6 in FIG. 17 for example, the large density reduction can be mitigated. It is acceptable that the printable area overlapping ratio is configured so that the difference of the printable area overlapping ratio between adjusting two unit areas becomes smaller stepwisely as the position closes in the central interval of passes. However, the difference can be 0% partly. Such as in FIG. 17, difference of the printable area overlapping ratio between that relates to straddling between passes performed before Pass 2 and passes performed after Pass 1 and that relates to straddling between passes performed before Pass 3 and passes performed after Pass 2 (25%) and difference of the printable area overlapping ratio between that relates to straddling between passes performed before Pass 3 and passes performed after Pass 2 and that relates to straddling between passes performed before Pass 4 and passes performed after Pass 3 (25%) are 0%. It is not necessary that all difference of the printable area overlapping ratio between adjusting two unit areas is different from each other.

Incidentally, in the above, although the mask to the nozzle row 802 of cyan has been explained as an example, the mask explained above can be used in common in every color. Moreover, different masks can also be prepared for respective colors. For example, in the case where how an ill effect of the density reduction is conspicuous is different depending on an ink color, it is all right that the printable area overlapping ratio that relates to straddling between Pass M and Pass M+1 is differentiated for every ink color.

Second Embodiment

Also in this embodiment, the same printing apparatus as that of the first embodiment shown in FIG. 1 is used. Moreover, regarding the control configuration, the block diagram shown in FIG. 2 shall be applicable. In this embodiment, the arrangement configuration of the nozzle row of each color in the printing head 201 differs from that of the first embodiment.

Figure 21:
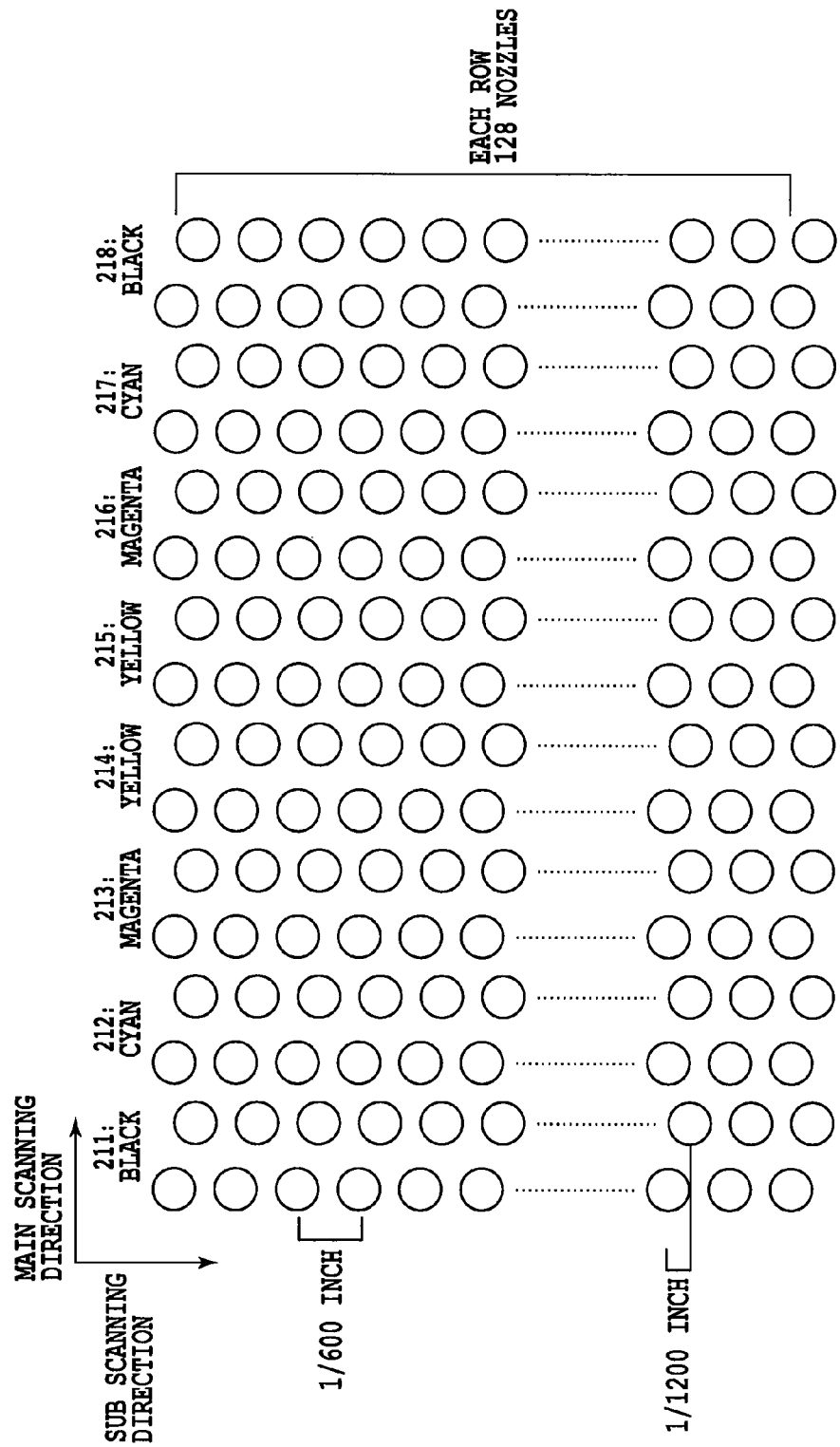
FIG. 21 is a diagram for explaining an arrangement configuration of the discharge ports (nozzles) of the printing heads of the second and third embodiments of the present invention.

FIG. 21 is a diagram for explaining the arrangement configuration of the discharge ports (nozzles) of the printing head 201 of this embodiment. In the figure, nozzle rows 211 and 218 are nozzle rows for black ink (K), and nozzle rows 212 and 217 are nozzle rows for cyan ink (C), nozzle rows 213 and 216 are nozzle rows for magenta ink (M), and nozzle rows 214 and 215 are the nozzle rows for yellow ink (Y). This embodiment has nozzle rows every two rows of which are allocated to each color, and these eight nozzle rows are arranged so as to make a symmetrical color relationship in the main scanning direction. If with such a configuration, when performing the printing in a forward direction and when performing the printing in a backward direction, a giving order of the inks to the print medium can be made coherent to K→C→M→Y→Y→M→C→K. As a result, even if a bidirectional printing scan is performed, it becomes possible to avoid color unevenness brought about by a difference in a giving order of the inks. Moreover, although a single nozzle row has upper limits in the number of times of ink discharging and a driving frequency, if two nozzle rows are prepared for each color as in this embodiment, these two rows can compensate the discharging for each other. For this reason, compared with the configuration of the first embodiment, it becomes possible to output an image with a faster speed or with a smaller number of multi-passes.

Figure 22:
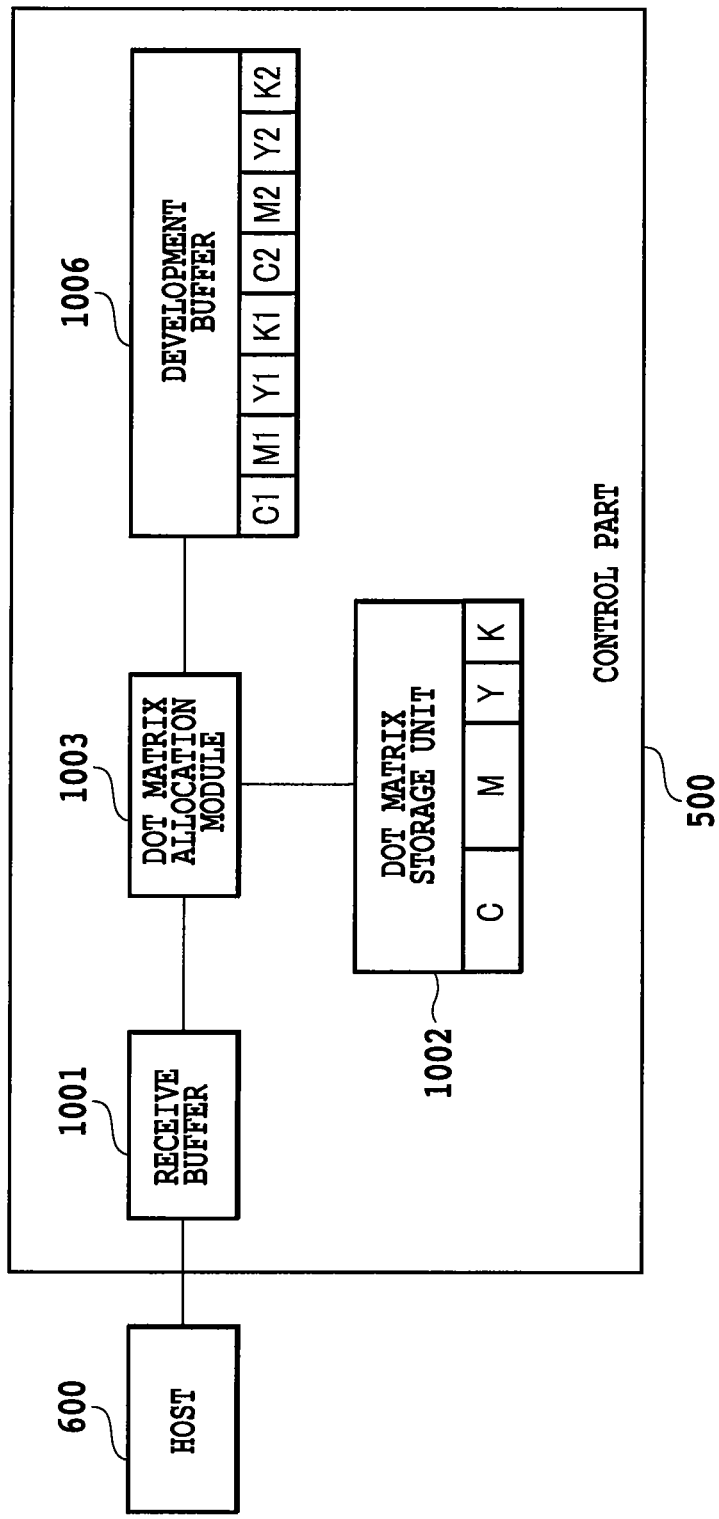
FIG. 22 is a block diagram for explaining conversion and a storage state of multiple valued data received from a host device in the control part of the second to third embodiments of the present invention.

FIG. 22 is a block diagram for explaining the conversion and the storage state of the multiple valued data that was received from the host device 600 in the control part 500 of this embodiment. Any constituent that has the same function as that of a counterpart of the first embodiment is designated by the same numeral as of the first embodiment. A constituent different from that of the first embodiment is only a development buffer 1006.

Also in this embodiment, by the dot matrix allocation module 1003, the dot matrix patterns stored in the dot matrix storage unit 1002 is selected corresponding to each pixel of 600 dpi. Then, it is divided into the odd number column data and the even number column data as shown in FIG. 8. In this embodiment, these odd number column data and even number column data are developed in different areas of the development buffers 1006, respectively. For example, the odd number column data of cyan is developed in the C1, and the even number column data is developed in the C2, respectively. This situation is the same also with other ink colors.

Figure 23:
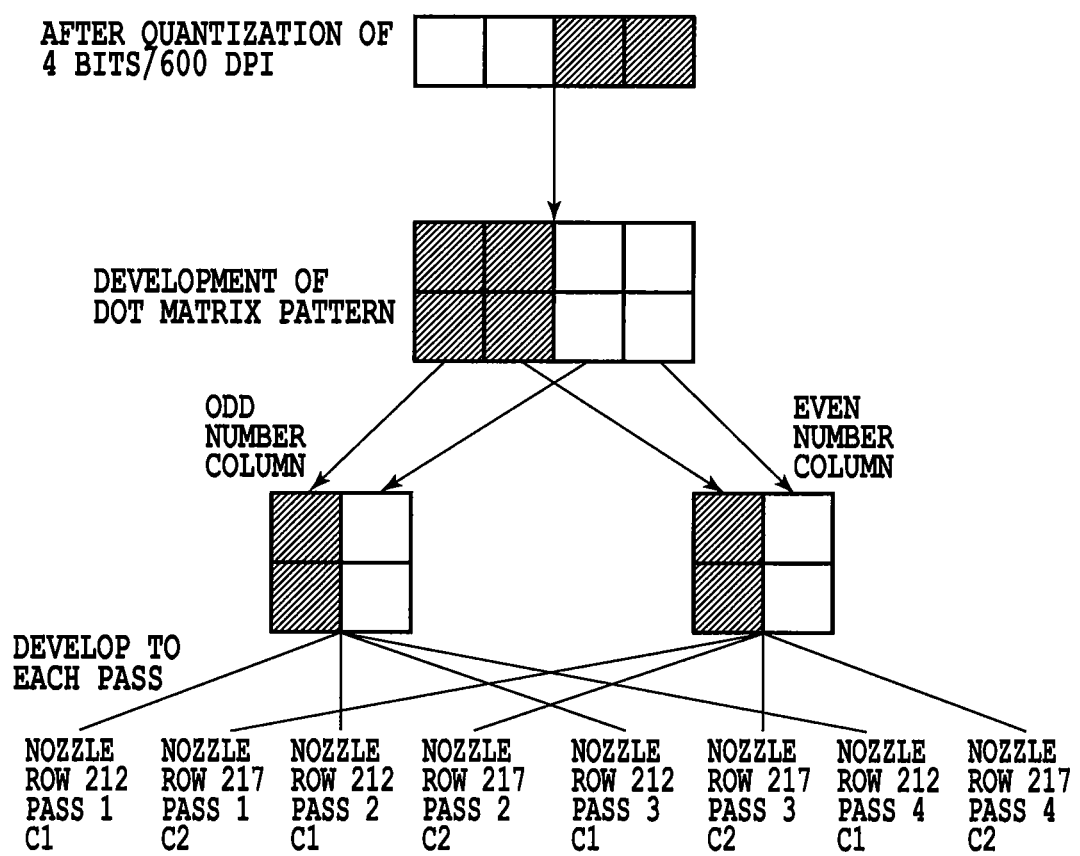
FIG. 23 is a diagram for explaining the two areas C1 and C2 of the development buffer, a nozzle row for printing binary data developed in each of them, and a printing scan of the multipass printing in association with one another.

FIG. 23 is a diagram for explaining two areas C1 and C2 of the development buffer 1006, a nozzle row for printing binary data developed in the each area, and a printing scan of the multipass printing in association with one another. In this embodiment, the odd number column data stored in the C1 of the development buffer 1006 is printed by the nozzle row 212 in the four printing scans. Moreover, the even number column data stored in the C2 of the development buffer 1006 is printed by the nozzle row 217 in the four printing scans. Printing scans of other colors have the same relationship. By adopting such a printing method, the odd number column data stored in the C1 and the even number column data stored in the C2 of the development buffer 1006 are printed on the print medium one over another to form the overlapped dot.

Figure 24:
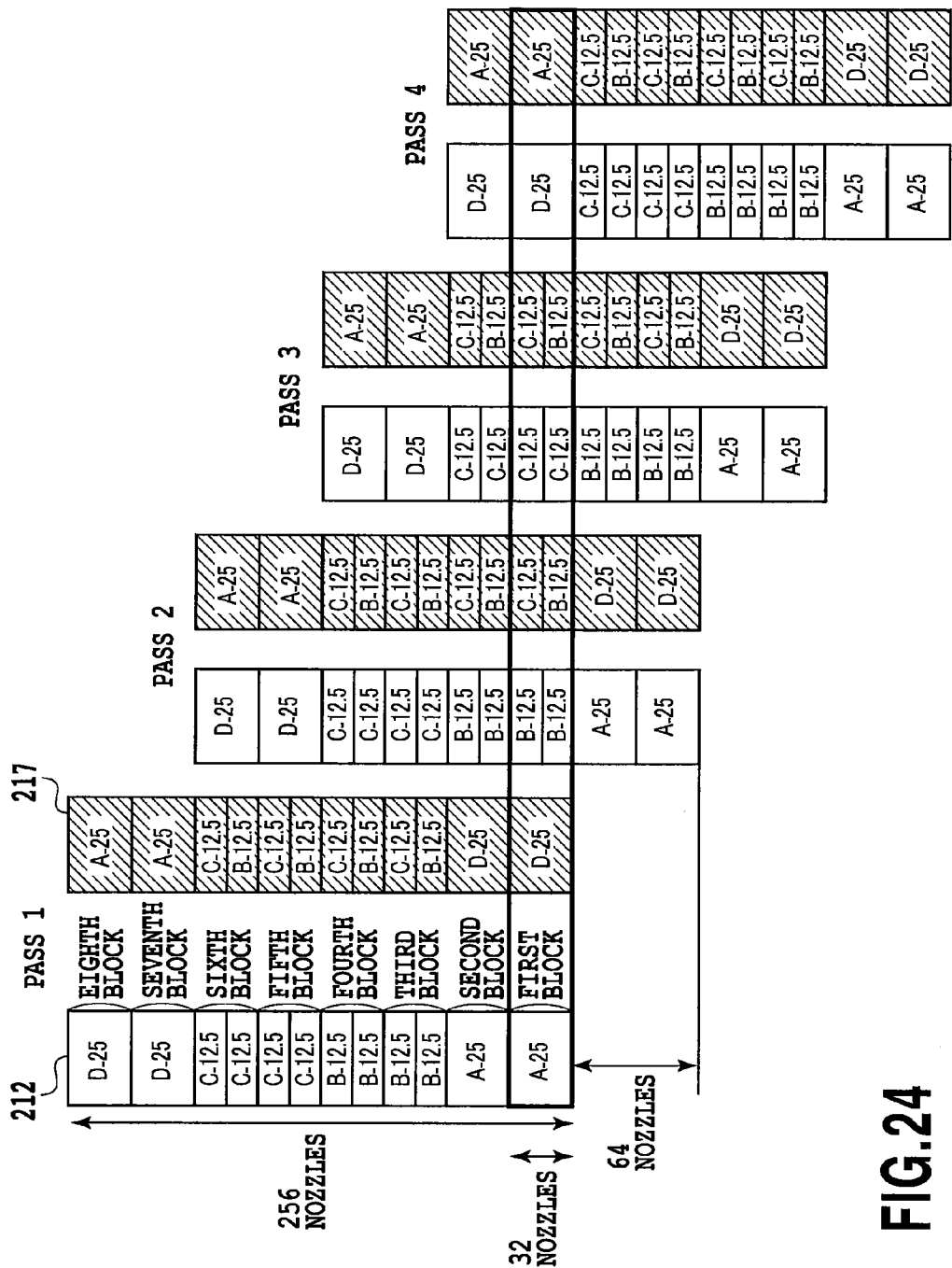
FIG. 24 is a schematic diagram for explaining a multipass printing method applied to the second embodiment of the present invention.

FIG. 24 is a schematic diagram for explaining the multipass printing method that is applied to this embodiment. Here, for simplicity, the explanation will be given taking masks for the nozzle rows 212 and 217 of cyan as an example. Also in this embodiment, four masks A to D that each have a printable ratio of almost 25% and are in a mutually exclusive and complimentary relationship.

In this embodiment, in the nozzle row 212 for printing the odd number column data and the nozzle row 217 for printing the even number column data, the mask patterns allocated to the respective blocks are differentiated.

In the nozzle row 212 for printing the odd number column data, the mask A_25 is allocated to the first block and the second block, and two masks B_12.5 are allocated to the third block and the fourth block. Moreover, two masks C_12.5 are allocated to the fifth block and the sixth block, and the mask D_25 is allocated to the seventh block and the eighth block, respectively. A symbol of an individual mask shows the kind and the printable ratio of the mask simultaneously, similarly with the first embodiment. For example, the mask B_25 of a print ratio of 25% generated by combining two masks B_12.5 that each have a printable ratio of 12.5% and are in a mutually exclusive relationship is allocated to the third block. This situation is the same also with the masks C and D.

In contrast to this, in the nozzle row 217 for printing the even number column data, the mask D_25 is allocated to the first block and the second block, and the mask B_12.5 and the mask C_12.5 are allocated to the third block and the fourth block. Moreover, the mask B_12.5 and the mask C_12.5 that are in an exclusive relationship to the mask of the third block are allocated to the fifth block and the sixth block. Furthermore, the mask A_25 is allocated to the seventh block and the eighth block.

In this embodiment, the multipass printing of bi-directional four passes is performed by using such masks. Then, each time an individual printing scan is completed, the print medium is conveyed by two blocks (as many as 64 nozzles) in the sub-scanning direction. Therefore, in the unit area having a width as many as 64 nozzles, by Pass 1, the odd number column data with the mask A_25 and the even number column data with the mask D_25 are printed. By Pass 2, the odd number column data with the two masks B_12.5 (mask B_25) and the even number column data with the mask B_12.5 and the mask C_12.5 are printed. Moreover, by Pass 3, the odd number column data with the two masks C_12.5 (mask C_25) and the even number column data with the mask B_12.5 and the mask C_12.5 are printed. Furthermore, by Pass 4, the odd number column data with the mask D_25 and the even number column data with the mask A_25 are printed. Since the masks A to D have the mutually exclusive and complementary relationship, all the pieces of the odd number column data are printed by the nozzle row 212 in four printing scans using the masks A to D. Moreover, all the pieces of the even number column data are printed by the nozzle row 217 in four printing scans using the masks A to D. As already explained, the dot printed by the odd number column data and the dot printed by the even number column data are printed at the same position being mutually overlapped.

Figure 25B:
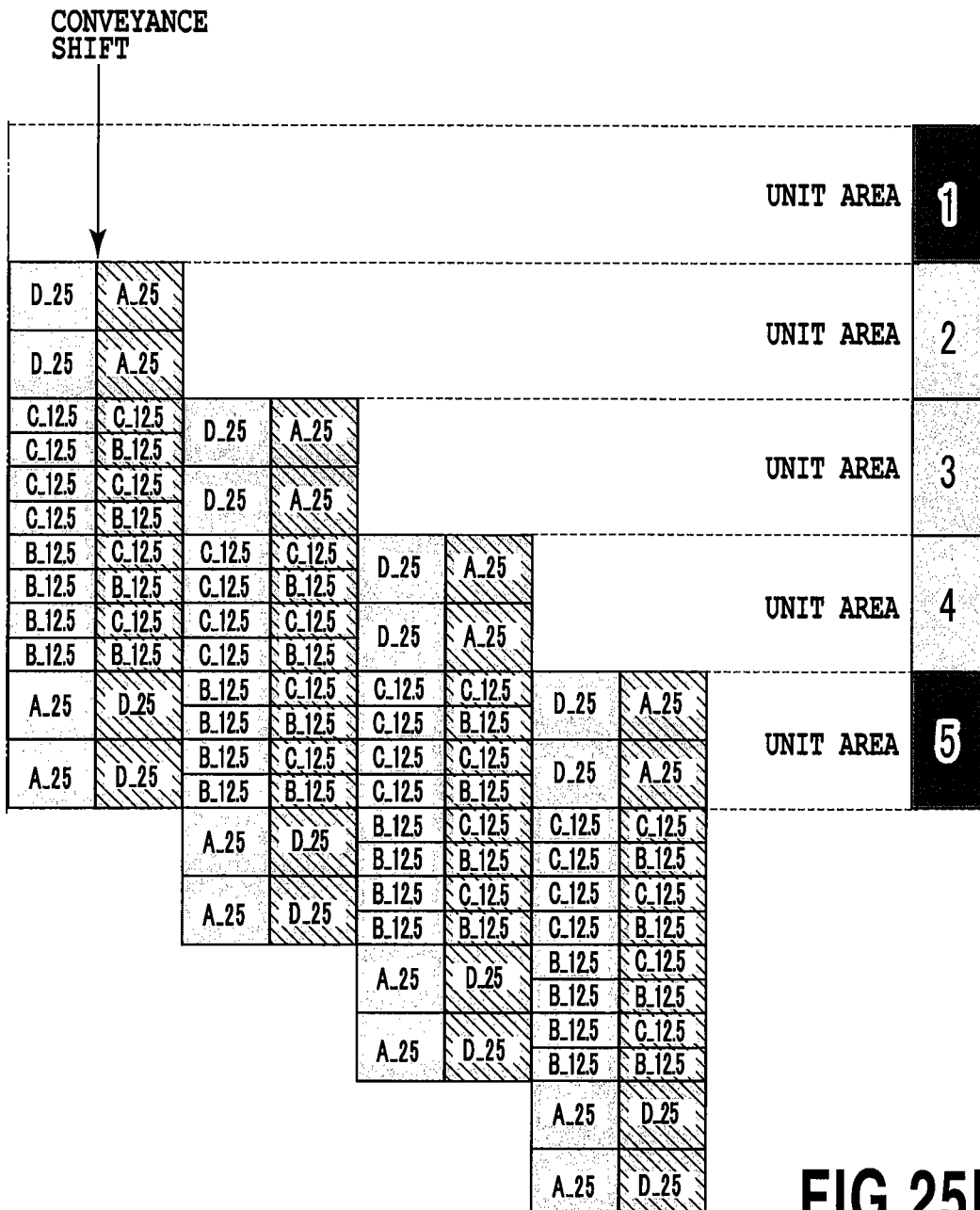
FIG. 25B is a diagram for explaining an occurrence state of the density fluctuation when the conveyance shift occurs in one certain conveyance operation in the case where the mask of the second embodiment of the present invention is used.

FIG. 25 is a diagram for explaining an occurrence state of the density fluctuation when the conveyance shift occurred in one certain conveyance operation, in the case where the mask of this embodiment is used. Here, a case where the conveyance shift occurred in the conveyance operation performed just before a pass (printing scan) designated by an arrow is assumed. The unit areas 1 to 5 show the area in which the printing scans (passes) are performed straddling therebetween the conveyance shift, and the unit areas that are adjacent to this.

The unit area 1 is an area (normal area) in which the printing scans were performed without straddling therebetween the conveyance operation in which the conveyance shift occurred.

The unit area 2 is an area in which the conveyance shift occurred between Pass 3 and Pass 4, and print positions of Pass 4 shifted relative to print positions of Pass 1 to Pass 3 (a print position shift of 1/4 pass).

The unit area 3 is an area in which the conveyance shift occurred between Pass 2 and Pass 3, and print positions of Pass 3 and Pass 4 shifted relative to print positions of Pass 1 and Pass 2 (a print position shift of 2/4 pass).

The unit area 4 is an area in which the conveyance shift occurred between Pass 1 and Pass 2, and print positions of Pass 2 to Pass 4 shifted relative to print positions of Pass 1 (a print position shift of 3/4 pass, i.e., 1/4 pass).

The unit area 5 is an area (normal area) in which the printing scans were performed without straddling therebetween the conveyance operation in which the conveyance shift occurred.

Figure 26:
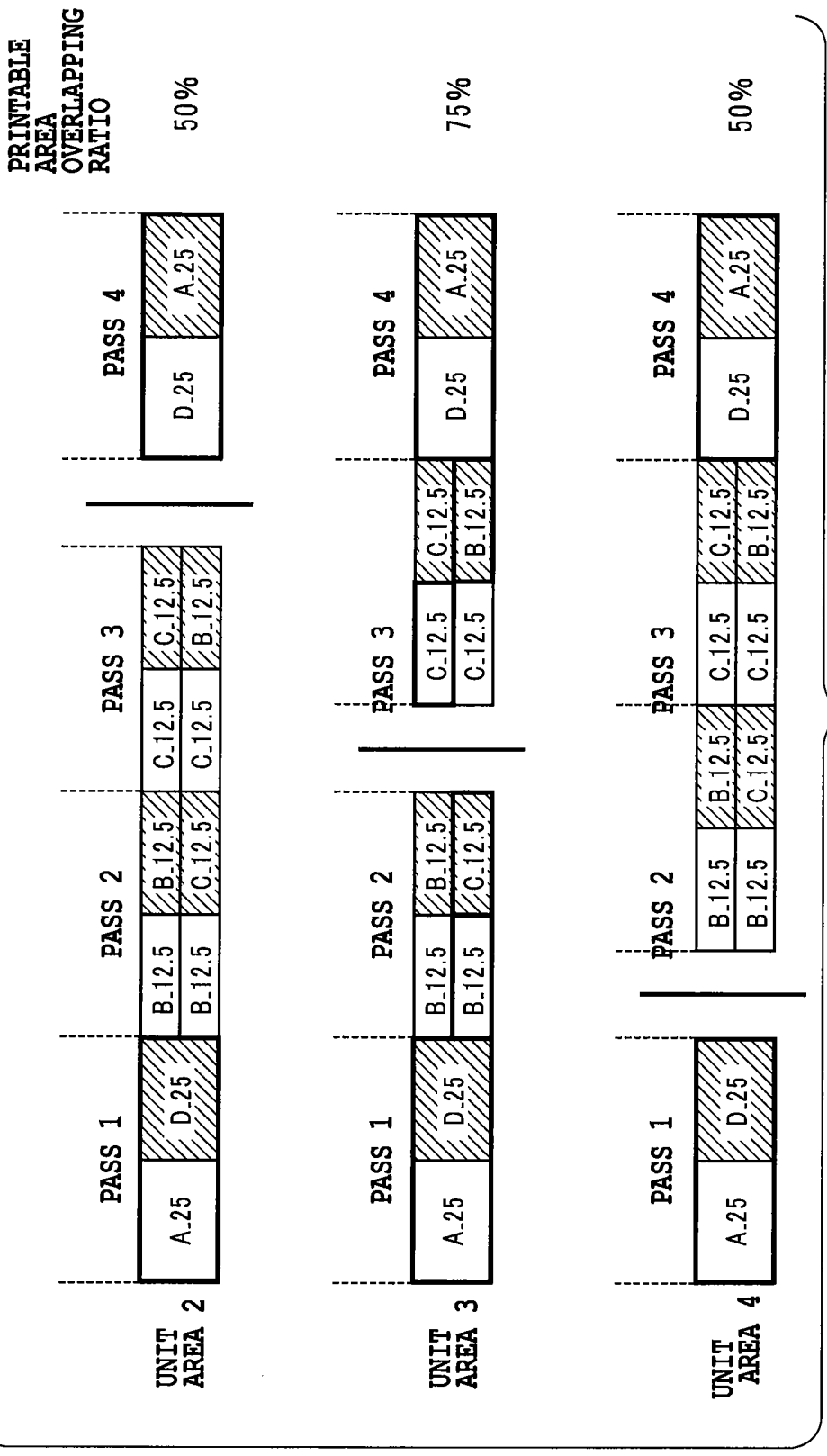
FIG. 26 is a diagram for explaining a state of overlapping or separation of each dot about three areas (unit areas 2 to 4) to which the influence of the conveyance shift exerts in the second embodiment.

FIG. 26 is a diagram for explaining a state of overlapping or separation of respective dots about three areas (unit areas 2 to 4) to which the influence of the conveyance shift exerts. In the figure, in the unit area 2, the conveyance shift having occurred between Pass 3 and Pass 4 separates the overlapped dots printed with the mask A and the overlapped dots printed with the mask D. That is, since the printable area overlapping ratio that relates to straddling between Pass 3 and Pass 4 is 25%+25%=50%, 50% of the whole overlapped dots is separated. The situation is the same also in the unit area 4.

In the unit area 3, the conveyance shift having occurred between Pass 2 and Pass 3 separates the overlapped dots printed with the mask A, the overlapped dots printed with the mask D, the overlapped dots printed with the mask B_12.5, and the overlapped dots printed with the mask C_12.5. That is, since the printable area overlapping ratio that relates to straddling between Pass 2 and Pass 3 is 25%+25%+12.5%+12.5%=75%, 75% of the whole overlapped dots is separated.

In four pass printing like this embodiment, the density reduction is most anticipated when the conveyance shift occurred between Pass 2 and Pass 3, like in the unit area 3. In this embodiment, by using a mask whose printable area overlapping ratio that relates to straddling between Pass 2 and Pass 3 is specified to be 75%, it becomes possible to suppress the density reduction by the conveyance shift to an appropriate quantity.

Incidentally, although the mask pattern configuration explained above was explained taking the nozzle row of cyan as an example, the nozzle row corresponding to other ink colors may adopt the same configuration as that of cyan or can use a mask pattern different from that of cyan.

Moreover, in the above, although the embodiment was explained as one with a configuration of printing a pair of the overlapped dots with two nozzle rows discharging the ink of the same color, this embodiment can also be applied to a configuration of printing the overlapped dot with two inks that are different in density or chroma although being of the same color. Also with the overlapped dot printed with the two inks different in density or chroma, the density reduction by a collapse of the complementary relationship of the dots and the density increase due to separation of these dots occur similarly although there is a difference in degree. Therefore, by adjusting the printable area overlapping ratio that relates to straddling between two consecutive passes according to a degree of the density fluctuation, it is possible to acquire the same effect as that of this embodiment explained above.

Third Embodiment

Also in this embodiment, configurations of the printing apparatus and control, a nozzle configuration of a printing head being used, a processing of the dot matrix pattern, and a storage configuration are the same as those of the second embodiment described above. However, in this embodiment, there will be given a printing method to explain a multipass printing of 16 passes that has a larger number of multipasses as a premise, the unit area where largest density reduction is anticipated with a focus given thereto, and other unit areas where the overlapped dot is separated by an appropriate quantity.

Figure 27A:
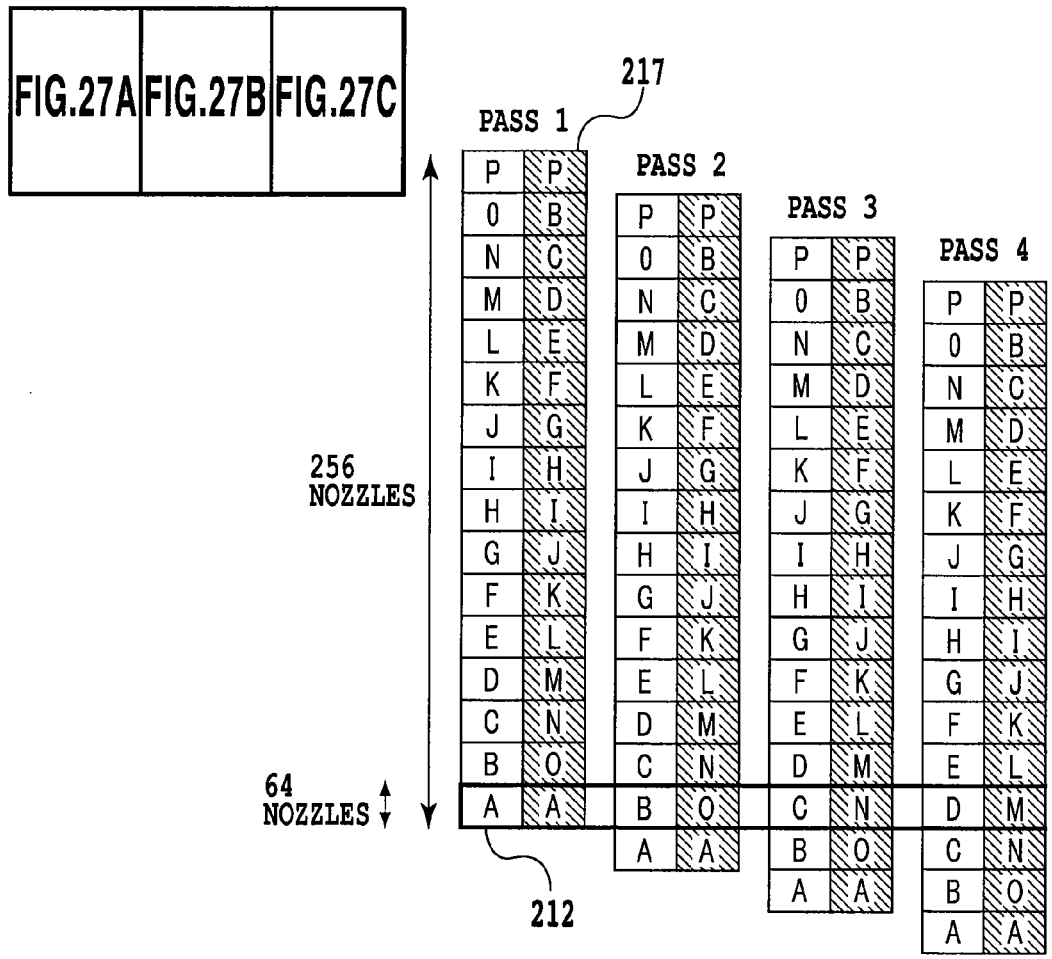
FIG. 27A is a schematic diagram for explaining a multipass printing method applied to a third embodiment of the present invention.
Figure 27B:
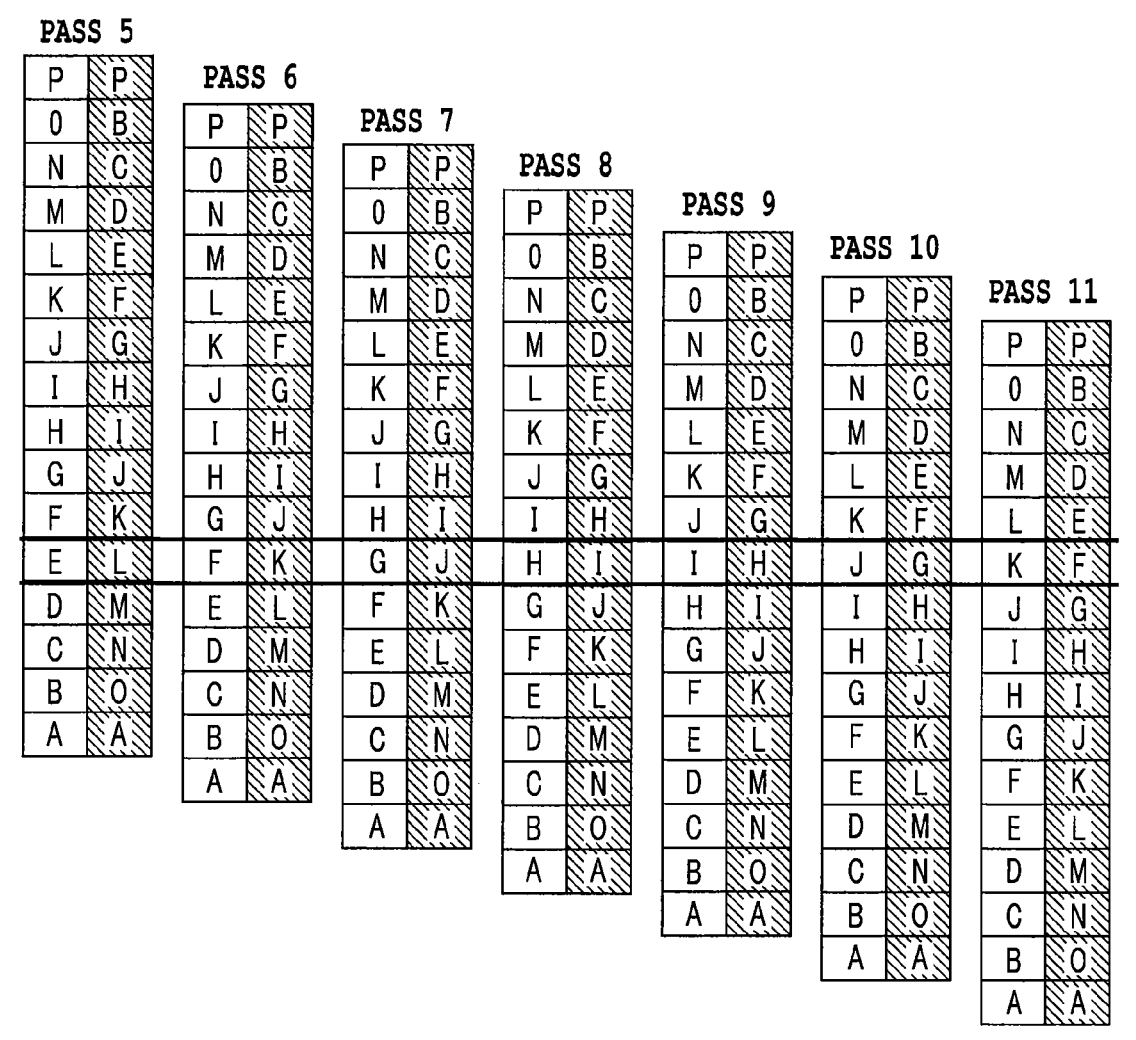
Figure 27C:
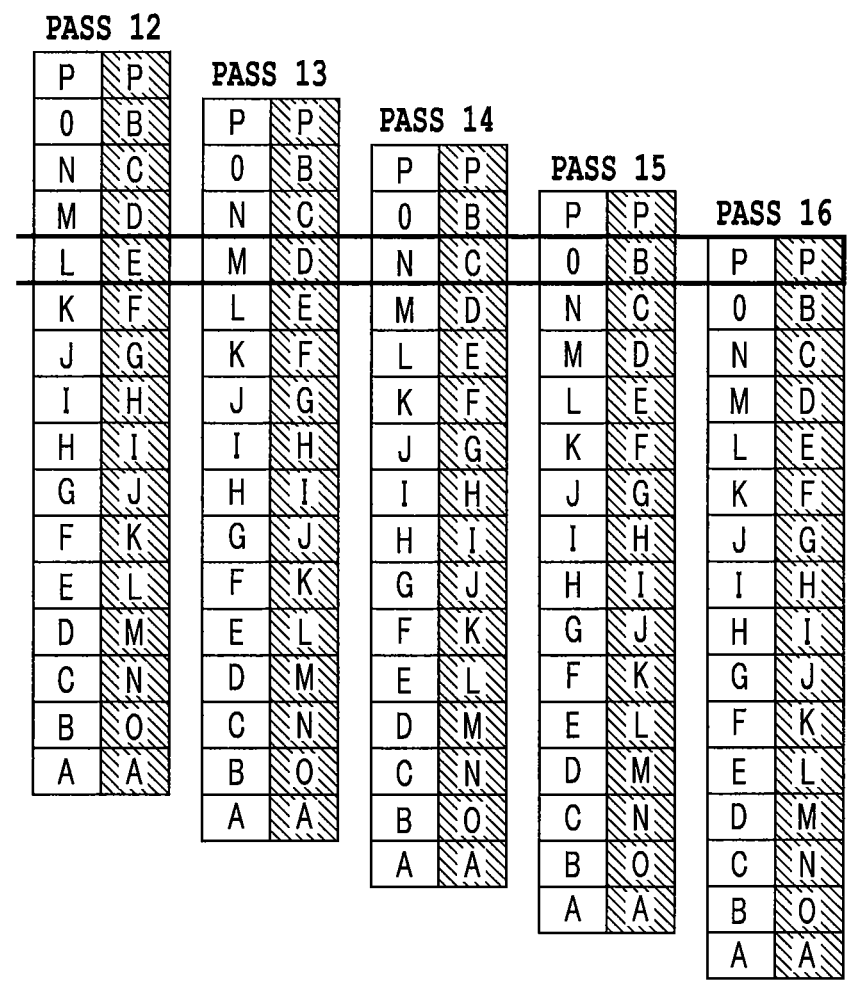

FIG. 27 is a schematic diagram for explaining the multipass printing method that is applied to this embodiment. Also here, for simplicity, explanation will be given taking masks of cyan with the nozzle rows 212 and 217, respectively, as an example. As masks of this embodiment, 16 kinds of masks A to P that each have a printable ratio of about 6.25% and are in the mutually exclusive and complementary relationship are prepared.

Also in this embodiment, similarly with the second embodiment, in the nozzle row 212 for printing the odd number column data and in the nozzle row 217 for printing the even number column data, mask patterns allocated for respective blocks are differentiated.

Regarding the nozzle row 212 for printing the odd number column data, the mask A to a mask P are allocated to the first block to the 16th block in this order. Moreover, regarding the nozzle row 217 for printing the even number column data, the mask A for the first block and the mask P for the 16th block are the same as those of the noise row 212. However, the second block to the 15th block are allocated the mask B to a mask O in an order reverse to that of the nozzle row 212.

In this embodiment, the multipass printing of bi-directional 16 passes is performed by using such masks. Then, each time an individual printing is completed, the print medium is conveyed by one block (as many as 16 nozzles) in the sub-scanning direction. With such a configuration, if a sudden conveyance shift occurs, the density reduction will be anticipated in the unit area of (16−1)=15.

Below, a state of a print position shift between in the unit area in which the density reduction in this embodiment is anticipated and in the unit areas 1 to 17 that are adjacent to this will be explained similarly with the above-mentioned embodiments.

The unit area 1 is an area (normal area) in which the printing scans were performed without straddling therebetween the conveyance operation in which the conveyance shift occurred.

The unit area 2 is an area in which the conveyance shift occurred between Pass 15 (15th pass) and Pass 16 (16th pass), and print positions of Pass 16 shifted relative to print positions of Pass 1 to Pass 15 (a print position shift of 1/16 pass).

The unit area 3 is an area in which the conveyance shift occurred between Pass 14 (14th pass) and Pass 15, and print positions of Pass 15 and Pass 16 shifted relative to print positions of Pass 1 to Pass 14 (a print position shift of 2/16 pass).

The unit area 4 is an area in which the conveyance shift occurred between Pass 13 (13th pass) and Pass 14, and print positions of Pass 14 to Pass 16 shifted relative to print positions of Pass 1 to Pass 13 (a print position shift of 3/16 pass).

The unit area 5 is an area in which the conveyance shift occurred between Pass 12 (12th pass) and Pass 13, and print positions of Pass 13 to Pass 16 shifted relative to print positions of Pass 1 to Pass 12 (a print position shift of 4/16 pass).

The unit area 6 is an area in which the conveyance shift occurred between Pass 11 (11th pass) and Pass 12, and print positions of Pass 12 to Pass 16 shifted relative to print positions of Pass 1 to Pass 11 (a print position shift of 5/16 pass).

The unit area 7 is an area in which the conveyance shift occurred between Pass 10 (10th pass) and Pass 11, and print positions of Pass 11 to Pass 16 shifted relative to print positions of Pass 1 to Pass 10 (a print position shift of 6/16 pass).

The unit area 8 is an area in which the conveyance shift occurred between Pass 9 (9th pass) and Pass 10, and print positions of Pass 10 to Pass 16 shifted relative to print positions of Pass 1 to Pass 9 (a print position shift of 7/16 pass).

The unit area 9 is an area in which the conveyance shift occurred between Pass 8 and Pass 9, and print positions of Pass 9 to Pass 16 shifted relative to print positions of Pass 1 to Pass 8 (a print position shift of 8/16 pass).

A unit area 10 is an area in which the conveyance shift occurred between Pass 7 and Pass 8, and print positions of Pass 8 to Pass 16 shifted relative to print positions of Pass 1 to Pass 7 (a print position shift of 9/16 pass, i.e., 7/16 pass).

A unit area 11 is an area in which the conveyance shift occurred between Pass 6 and Pass 7, and print positions of Pass 7 to Pass 16 shifted relative to print positions of Pass 1 to Pass 6 (a print position shift of 10/16 pass, i.e., 6/16 pass).

A unit area 12 is an area in which the conveyance shift occurred between Pass 5 and Pass 6, and print positions of Pass 6 to Pass 16 shifted relative to print positions of Pass 1 to Pass 5 (a print position shift of 11/16 pass, i.e., 5/16 pass).

A unit area 13 is an area in which the conveyance shift occurred between Pass 4 and Pass 5, and print positions of Pass 5 to Pass 16 shifted relative to print positions of Pass 1 to Pass 4 (a print position shift of 12/16 pass, i.e., 4/16 pass).

A unit area 14 is an area in which the conveyance shift occurred between Pass 3 and Pass 4, and print positions of Pass 4 to Pass 16 shifted relative to print positions of Pass 1 to Pass 3 (a print position shift of 13/16 pass, i.e., 3/16 pass).

A unit area 15 is an area in which the conveyance shift occurred between Pass 2 and Pass 3, and print positions of Pass 3 to Pass 16 shifted relative to print positions of Pass 1 and Pass 2 (a print position shift of 14/16 pass, i.e., 2/16 pass).

A unit area 16 is an area in which the conveyance shift occurred between Pass 1 and Pass 2, and print positions of Pass 2 to Pass 16 shifted relative to print positions of Pass 1 (a print position shift of 15/16 pass, i.e., 1/16 pass).

The unit area 17 is an area (normal area) in which the printing scans were performed without straddling therebetween the conveyance operation in which the conveyance shift occurred.

From the above, in the multipass printing of 16 passes like this embodiment, the density reduction of the unit area 9 where the conveyance shift occurs between Pass 8 and Pass 9 is most anticipated, and next to it, the density reduction of the unit area 7 and the unit area 10 located on both sides thereof is anticipated. The print position shift that serves as a degree of apprehension for the density reduction becomes smaller as the position departs from the unit area 9 located at the center. In order to cope with such a situation, while the printable area overlapping ratio that relates to straddling between Pass 8 and Pass 9 is set high, the printable area overlapping ratio that relates to straddling between other consecutive passes is also configured to decrease stepwise from that between the above-mentioned Pass 8 and Pass 9.

Figures 28, 28A, 28B, 29C:
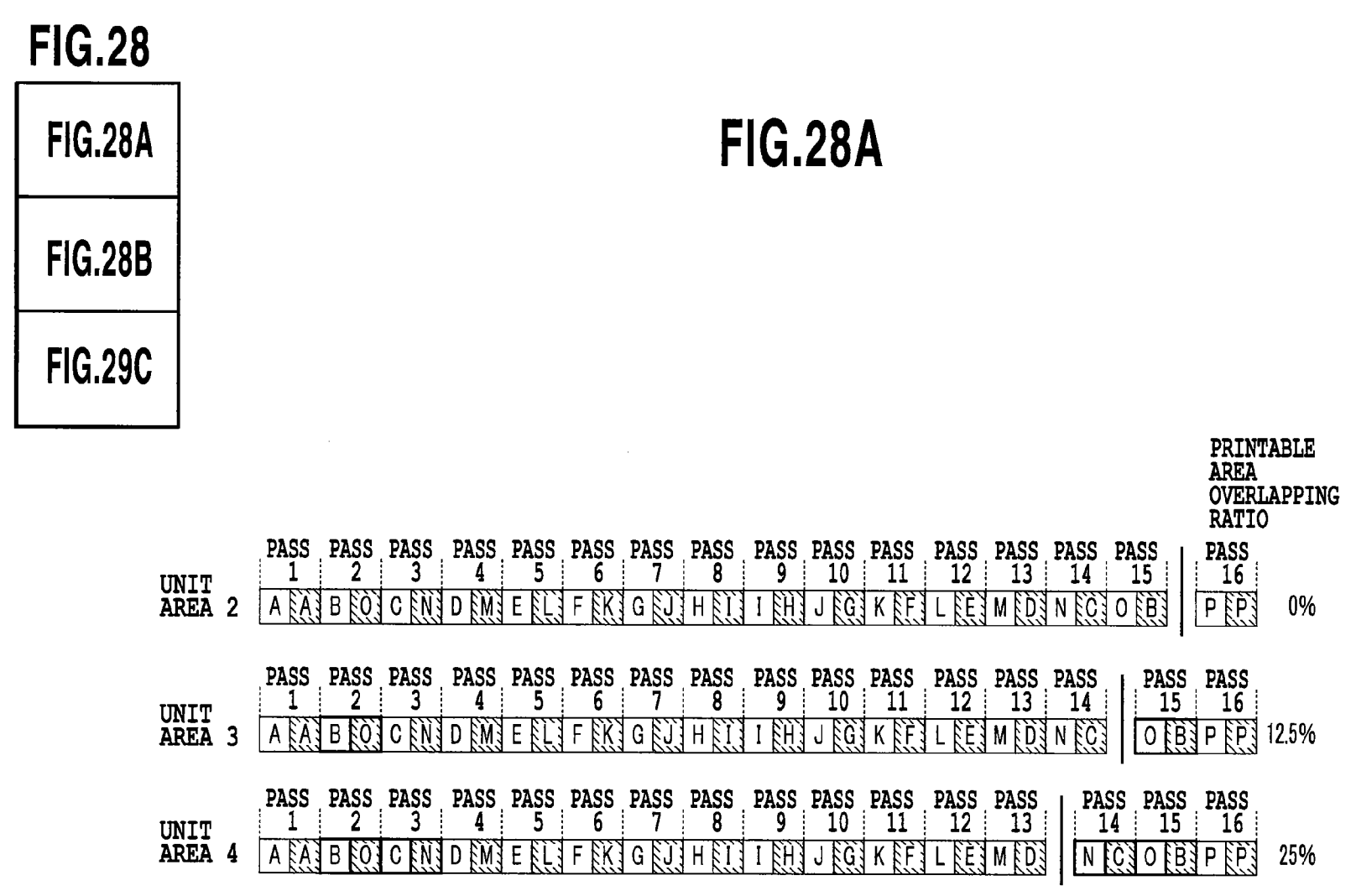
Figure 28C:
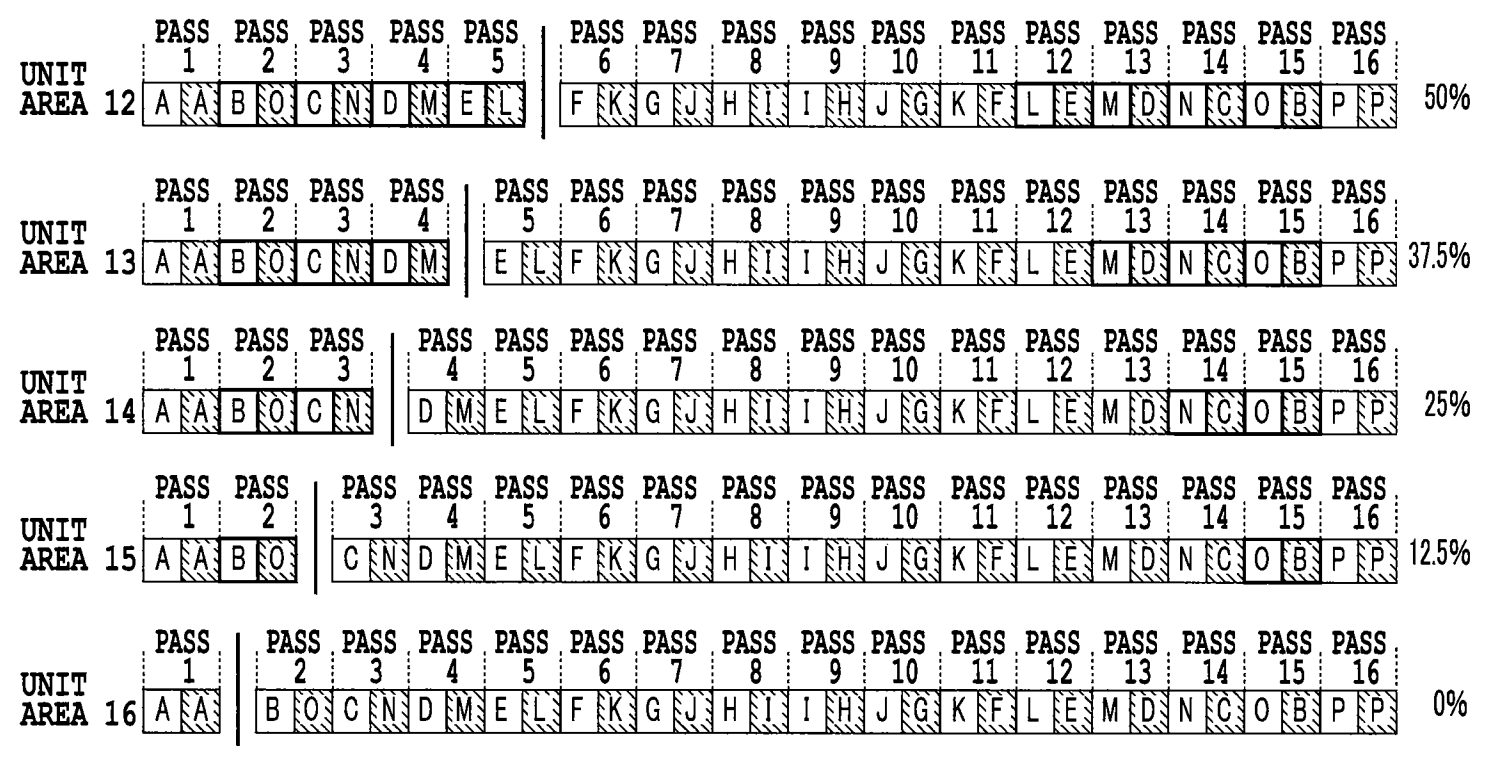

FIG. 28 is a diagram for, about 15 areas (unit areas 2 to 16) to which the influence of the above-mentioned conveyance shift exerts, explaining a state of overlapping or separation of each dot.

In the figure, in the unit area 2, the overlapped dots printed with the mask P move relative to the other dots by the conveyance shift having occurred between Pass 15 and Pass 16. However, since the printable area overlapping ratio that relates to straddling between Pass 15 and Pass 16 is 0%, the overlapped dots do not separate in dots. The situation is the same also in the unit area 16.

In the unit area 3, the overlapped dots printed with the mask B and the overlapped dots printed with the mask O separate by the conveyance shift having occurred between Pass 14 and Pass 15. That is, since the printable area overlapping ratio that relates to straddling between Pass 14 and Pass 15 is 6.25%+6.25%=12.5%, 12.5% of the whole overlapped dots is separated. The situation is the same also in the unit area 15.

In the unit area 4, the overlapped dots printed with the mask B, the mask C, a mask N, and the mask O are separated by the conveyance shift having occurred between Pass 13 and Pass 14. That is, since the printable area overlapping ratio that relates to straddling between Pass 13 and Pass 14 is 6.25%×4=25%, 25% of the whole overlapped dots is separated. The situation is the same also in the unit area 14.

In the unit area 5, the overlapped dots printed with the mask B, the mask C, the mask D, a mask M, the mask N, and the mask O are separated by the conveyance shift having occurred between Pass 12 and Pass 13. That is, since the printable area overlapping ratio that relates to straddling between Pass 12 and Pass 13 is 6.25%×6=37.5%, 37.5% of the whole overlapped dots is separated. This situation is the same also in the unit area 13.

In the unit area 6, the overlapped dots printed with the mask B, the mask C, the mask D, a mask E, the mask L, the mask M, the mask N, and the mask O are separated by the conveyance shift occurring between Pass 11 and Pass 12. That is, since the printable area overlapping ratio that relates to straddling between Pass 11 and Pass 12 is 6.25%×8=50%, 50% of the whole overlapped dots is separated. This situation is the same also in the unit area 12.

In the unit area 7, the overlapped dots printed with the mask B, the mask C, the mask D, the mask E, a mask F, a mask K, the mask L, the mask M, the mask N, and the mask O are separated by the conveyance shift having occurred between Pass 10 and Pass 11. That is, since the printable area overlapping ratio that relates to straddling between Pass 10 and Pass 11 is 6.25%×10=62.5%, 62.5% of the whole overlapped dots is separated. This situation is the same also in the unit area 11.

In the unit area 8, the overlapped dots printed with the mask B, the mask C, the mask D, the mask E, the mask F, a mask G, a mask J, the mask K, the mask L, the mask M, the mask N, and the mask O are separated by the conveyance shift having occurred between Pass 9 and Pass 10. That is, the printable area overlapping ratio that relates to straddling between Pass 9 and Pass 10 is 6.25%×12=75%, 75% of the whole overlapped dots is separated. This situation is the same also in the unit area 10.

In the unit area 9, the overlapped dots printed with the mask B, the mask C, the mask D, the mask E, the mask F, the mask G, a mask H, a mask I, the mask J, the mask K, the mask L, the mask M, the mask N, and the mask O are separated by the conveyance shift having occurred between Pass 8 and Pass 9. That is, since the printable area overlapping ratio that relates to straddling between Pass 8 (eighth pass) and Pass 9 (ninth pass) is 6.25%×14=87.5%, 87.5% of the whole overlapped dots is separated.

Thus, with the mask of this embodiment, the printable area overlapping ratio that relates to straddling between Pass 8 and Pass 9 has become as sufficiently high a value as 87.5%. Therefore, even in the unit area 9 where the largest density reduction is anticipated, it is possible to mitigate the density reduction. Moreover, in this embodiment, while the printable area overlapping ratio that relates to straddling between Pass 8 and Pass 9 is set high, the printable area overlapping ratio that relates to straddling between other two consecutive passes is also set to reduce stepwise from that between Pass 8 and Pass 9 described above. By adopting such a configuration in advance, it becomes possible to suppress the density reduction by the conveyance shift to an appropriate quantity for all the unit areas.

In the following, conditions to realize a state like this are shown concretely, focusing a (M±L)th printing scan ((M±L)th pass), where L is an integer smaller than M, taking a case where generally the multipass printing of 2M passes (by 2M scans) is performed as an example. The first condition is that the printable area overlapping ratio that relates to straddling between Pass M (M-th pass) and Pass M+1 ((M+1)th pass) is larger than the printable area overlapping ratio that relates to straddling between other two consecutive printing scans. The second condition is that the printable area overlapping ratio that relates to straddling between Pass M−L ((M−L)th pass) and Pass M−L+1 ((M−L+1)th pass) is smaller than the printable area overlapping ratio that relates to straddling between Pass M−L+1 ((M−L+1)th pass) and Pass M−L+2 ((M−L+2)th pass) and is larger than the printable area overlapping ratio that relates to straddling between Pass M−L−1 ((M−L−1)th pass) and Pass M−L. The third condition is that the printable area overlapping ratio that relates to straddling between Pass M+L ((M+L)th pass) and Pass M+L+1 ((M+L+1)th pass) is larger than the printable area overlapping ratio that relates to straddling between Pass M+L+1 ((M+L+1)th pass) and Pass M+L+2 ((M+L+2)th pass) and is smaller than the printable area overlapping ratio that relates to straddling between Pass M+L−1 ((M+L−

1)th pass) and Pass M+L. If the above three conditions are fulfilled, it will become possible to suppress the density reduction by the conveyance shift to an appropriate quantity for all the unit areas in the multipass printing of 2M passes.

Incidentally, although the printable area overlapping ratio that related to straddling between Pass 1 and Pass 2 and between Pass 15 and Pass 16 should be 0% in this embodiment, this embodiment is not restricted to this. Generally, in the case of printing with increased number of multipasses, in an area in which the conveyance shift occurs between the passes in an edge part, such as the unit area 2 and the unit area 16, a ratio whereby the dot is shifted is as small as 6.25% and the density reduction is difficult to notice. Therefore, in this embodiment, the printable area overlapping ratio that relates to straddling between such passes was specified to be 0%. However, depending on the kind of print medium or the size of the dot, there is a case where the density reduction may be conspicuous also in such an area. In such a case, what is necessary is that the printable area overlapping ratio is just adjusted so that a proper quantity of separation of the overlapped dots may be performed even if it is in the unit area of the end, and the density reduction can be mitigated to be a well-balanced state for all the unit areas.

Fourth Embodiment

Also in this embodiment, configurations of the printing apparatus and control, a nozzle configuration of a printing head that is used, processing of the dot matrix pattern, and a storage configuration are the same as those of the second and third embodiments described above. However, in this embodiment, the arrangement configuration of discharge ports of the printing head 201 is different from that of the above-mentioned embodiments, 160 discharge ports are arranged in the sub-scanning direction with a pitch of 600 dpi for each of the even nozzle row and the odd number nozzle row. That is, it can be considered that 320 nozzles of each color that is a sum of the even nozzle row and the odd number nozzle row are arranged in the sub-scanning direction with a pitch of 1200 dpi. With the printing head equipped with such nozzle rows, the multipass printing of five passes that is the odd number pass is performed in this embodiment. A mask whose printable area overlapping ratio that relates to straddling between two consecutive passes is adjusted is used similarly with the above-mentioned third embodiment.

Figure 29:
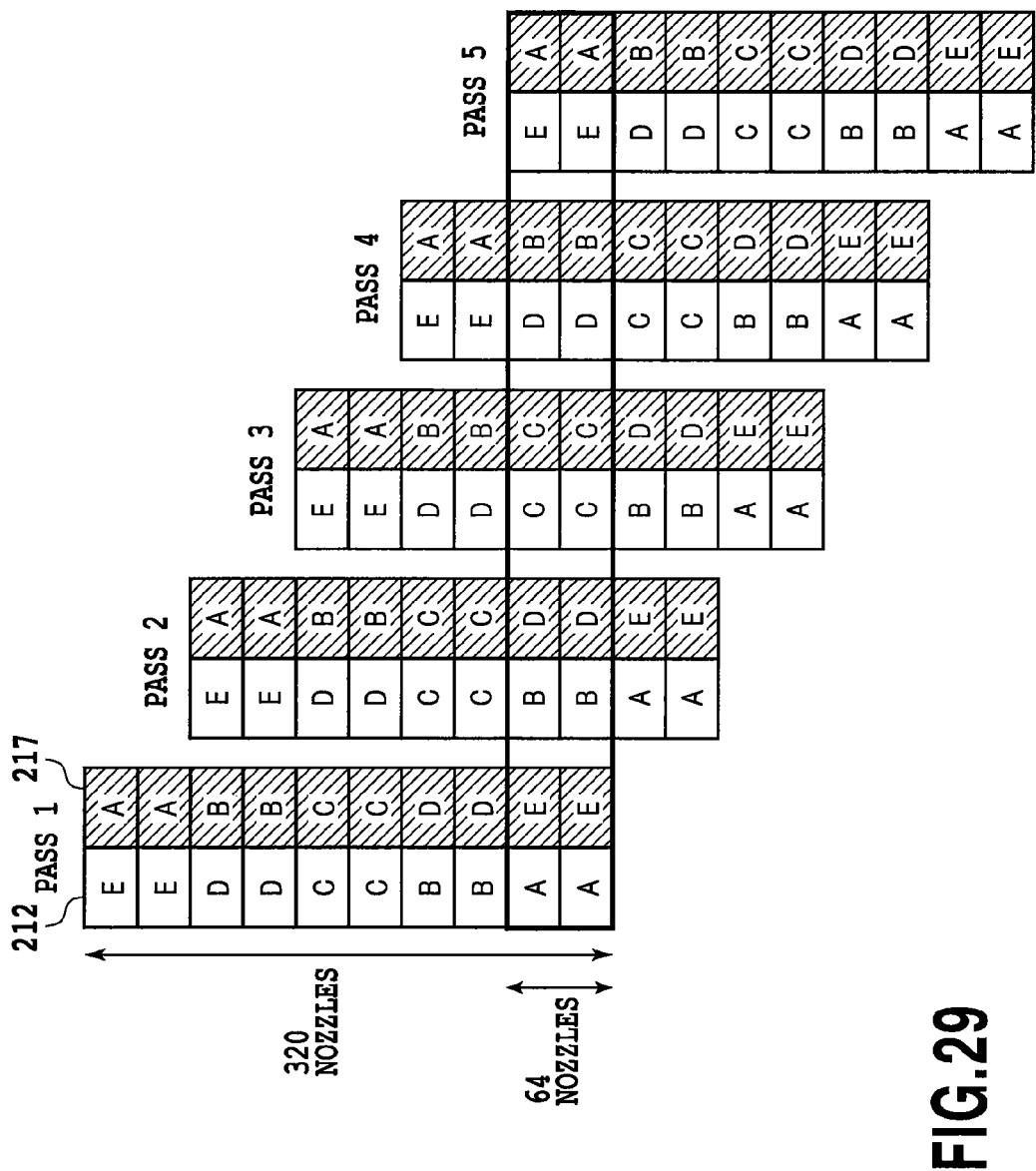
FIG. 29 is a schematic diagram for explaining a multipass printing method applied to a fourth embodiment of the present invention.

FIG. 29 is a schematic diagram for explaining the multipass printing method that is applied to this embodiment. Also here, for simplicity, mask for the nozzle rows 212 and 217 of cyan will be explained as an example. As masks of this embodiment, five kinds of masks A to E that each have a printable ratio of almost 20% and are in the mutually exclusive and complementary relationship are prepared.

Also in this embodiment, similarly with the second and third embodiments, in the nozzle row 212 for printing the odd number column data and in the nozzle row 217 for printing the even number column data, mask patterns allocated to respective blocks are differentiated.

Regarding the nozzle row 212 for printing the odd number column data, the mask A to the mask E are allocated to the first block to the fifth block in this order. Moreover, regarding the nozzle row 217 for printing the even number column data, the mask A to the mask E are allocated similarly in an order reverse to that of the nozzle row 212.

In this embodiment, the multipass printing of bi-directional five passes is performed by using such masks. Then each time individual printing scan is completed, the print medium is conveyed by one block (as many as 64 nozzles) in the sub-scanning direction. With such a configuration, when a sudden conveyance shift occurs, the density reduction in the unit area of (5−1)=4 is anticipated.

Below, a state of the print position shift in the unit area in which the density reduction in this embodiment is anticipated and in the unit areas 1 to 6 that are adjacent to this will be explained similarly with the above-mentioned embodiments.

The unit area 1 is an area (normal area) in which the printing scans were performed without straddling therebetween the conveyance operation in which the conveyance shift occurred.

The unit area 2 is an area in which the conveyance shift occurred between Pass 2 and Pass 3, and print positions of Pass 5 shifted relative to print positions of Pass 1 to Pass 4 (a print position shift of 1/5 pass).

The unit area 3 is an area in which the conveyance shift occurred between the Pass 3 and Pass 4, and print positions of Pass 4 and Pass 5 shifted relative to print positions of Pass 1 to Pass 3 (a print position shift of 2/5 pass).

The unit area 4 is an area in which the conveyance shift occurred between the Pass 2 and Pass 3, and print positions of Pass 3 to Pass 5 shifted relative to print positions of Pass 1 and Pass 2 (a print position shift of 3/5 pass, i.e., 2/5 pass).

The unit area 5 is an area in which the conveyance shift occurred between the Pass 1 and Pass 2, and the print position of Pass 2 to Pass 5 shifted relative to print position of Pass 1 (a print position shift of 4/5 pass, i.e., 1/5 pass).

The unit area 6 is an area (normal area) in which the printing scans were performed without straddling therebetween the conveyance operation in which the conveyance shift occurred.

From the above, in the multipass printing of five passes like this embodiment, the density reduction in the unit area 3 and the unit area 4 that has a print position shift of 2/5 pass is most anticipated. Next to this, the density reduction in the unit area 2 and the unit area 5 that have a print position shift of 1/5 pass is anticipated.

Figure 30:
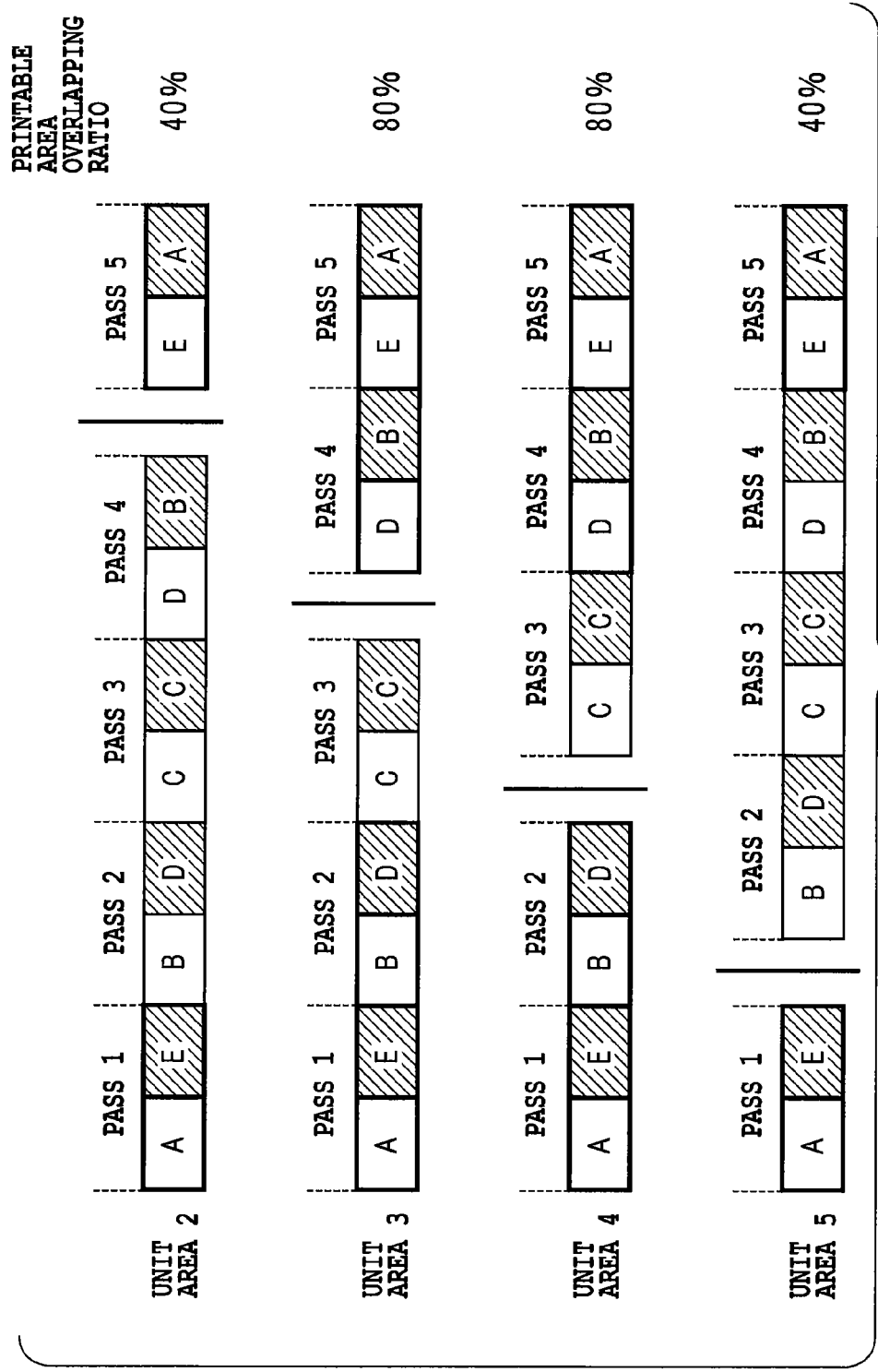
FIG. 30 is a diagram for explaining a state of overlapping or separation of each dot about four areas (unit areas 2 to 5) to which the influence of the conveyance shift exerts in the fourth embodiment.

FIG. 30 is a diagram for explaining overlapping or separation of each dot about four areas (the unit areas 2 to 5) to which the above-mentioned conveyance shift exerts.

In the figure, in the unit area 2, the overlapped dots printed with the mask A and the overlapped dots printed with the mask E are separated by the conveyance shift having occurred between Pass 4 and Pass 5. That is, since the printable area overlapping ratio that relates to straddling between Pass 4 and Pass 5 is 20%+20%=40%, 40% of the whole overlapped dots are separated. The situation is the same also in the unit area 5.

In the unit area 3, the overlapped dots printed with the mask A, the mask B, the mask D, and the mask E are separated by the conveyance shift having occurred between Pass 3 and Pass 4. That is, since the printable area overlapping ratio that relates to straddling between Pass 3 and Pass 4 is 20%× 4=80%, 80% of the whole overlapped dots is separated. The situation is the same also in the unit area 4.

Thus, with the mask of this embodiment, the printable area overlapping ratios between Pass 2 and Pass 3 and between Pass 3 and Pass 4 are sufficiently high values as 80%, attaining the same ratio. Therefore, even in the unit area 3 and the unit area 4 where the largest density reduction is anticipated, it is possible to mitigate the density reduction equally. Moreover, with this embodiment, while the printable area overlapping ratio that relates to straddling between these passes is set high, the printable area overlapping ratios that relates to straddling between Pass 1 and Pass 2 and between Pass 4 and Pass 5 are set to decrease stepwisely from the printable area overlapping ratio that relates to straddling between the above-mentioned passes. By adopting such a configuration in advance, even when performing the multipass printing of the odd number pass, it is possible to mitigate the density reduction in all the unit areas to an appropriate quantity.

According to this embodiment, when performing the multipass printing of 2M+1 passes, a mask such that the printable area overlapping ratio that relates to straddling between Pass M and Pass M+1 and between Pass M+1 and Pass M+2 is set higher than the printable area overlapping ratio that relates to straddling between other two consecutive passes is used. By this setting, even in the case where the complementary relationship of the dots collapses due to a sudden conveyance shift etc. and the density reduction is anticipated, increase of the density is accelerated by the dots of the first column data and the dots of the second column data being separated, and thereby it becomes possible to mitigate the above-mentioned density reduction. Moreover, by adjusting the above-mentioned printable area overlapping ratio, it is also possible to realize separation of the dots that is suited to a degree of the anticipated density reduction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-087192, filed Mar. 31, 2009, which is hereby incorporated by reference herein in its entirety.

What is claimed is:

1. A printing apparatus for printing an image on a printing medium by scanning a printing head across a unit area of the print medium 2M times (M is an integer larger than 1), comprising:
a dividing unit which divides image data of an image that should be printed in the unit area into 2M sections of image data for the 2M printing scans (Scan 1 to Scan 2M) by using a mask setting print permitted dot areas, in which dots are permitted to be printed by the printing head, included in the unit area for each of the 2M printing scans, respectively, so that plural dots of the same type of color may be printed at the same dot area by at least two printing scans; and
a printing unit which prints dots in the print permitted dot areas in each of the 2M printing scans (Scan 1 to Scan 2M) according to the divided image data,
wherein the mask is configured so that
i) a number of the print permitted dot areas in which printing is permitted both by scans performed before Scan (M+1) and by scans performed after Scan M is larger than a number of the print permitted dot areas in which printing is permitted both by scans performed before Scan N+1 (N is an integer differing from M and smaller than 2M) and by scans performed after Scan N in the unit area,
ii) a number of the print permitted dot areas in which printing is permitted both by scans performed before Scan (M−L+1) (L is a positive integer and L≤M−2) and by scans performed after Scan (M−L) is smaller than a number of the print permitted dot areas in which printing is permitted both by scans performed before Scan (M−L+2) and by scans performed after Scan (M−L+1) in the unit area, and a number of the print permitted dot areas in which printing is permitted both by scans performed before Scan (M+L+1) and by scans performed after Scan (M+L) is larger than a number of the print permitted dot areas in which printing is permitted both by scans performed before Scan (M+L+2) and by scans performed after Scan (M+L+1) in the unit area, and
iii) as for at least one combination of S and T (S and T are different and positive integers smaller than 2M), a difference between a number of the print permitted dot areas in which printing is permitted both b scans performed before Scan (S+1) and by scans performed after Scan S and a number of the print permitted dot areas in which printing is permitted both by scans performed before Scan (S+2) and by scans performed after Scan (S+1), is different from a difference between a number of the print permitted dot areas in which printing is permitted both by scans performed before Scan (T+1) and by scans performed after Scan T and a number of the print permitted dot areas in which printing is permitted both by scans performed before Scan (T+2) and by scans performed after Scan (T+1).

2. The printing apparatus according to claim 1, wherein a number of the print permitted dot areas in which printing is permitted both by scans performed before Scan (M+1) and by scans performed after Scan M is less than the total number of dot areas in the unit area.

3. The printing apparatus according to claim 1, wherein a number of the print permitted dot areas in which printing is permitted both by scans performed before Scan (N+1) and by scans performed after Scan N is larger than 0.

4. The printing apparatus according to claim 1, wherein the printing head is equipped with two nozzle rows for printing two dots of the same type of color.

5. The printing apparatus according to claim 1, wherein the mask is configured so that
for all combinations of S and T, the difference between the number of the print permitted dot areas in which printing is permitted both by scans performed before Scan (S+1) and by scans performed after Scan S and the number of the print permitted dot areas in which printing is permitted both by scans performed before Scan (S+2) and by scans performed after Scan (S+1), is different from the difference between the number of the print permitted dot areas in which printing is permitted both by scans performed before Scan (T+1) and by scans performed after Scan T and the number of the print permitted dot areas in which printing is permitted both by scans performed before Scan (T+2) and by scans performed after Scan (T+1).

6. The printing apparatus according to claim 1, wherein the mask includes masks, for one scan performed before Scan (M+1) and for another scan performed after Scan M, that are in a mutually complementary relationship, and includes masks, for one scan performed before Scan (M+1) and for another scan performed after Scan M, that are in a partial mutually complementary relationship.

7. A printing method for printing an image on a printing medium by scanning a printing head across a unit area of the print medium 2M times (M is an integer larger than 1), comprising:
a dividing step to divide image data of an image that should be printed in the unit area into 2M sections of image data for the 2M printing scans (Scan 1 to Scan 2M) by using a mask setting print permitted dot areas, in which dots are permitted to be printed by the printing head, included in the unit area for each of the 2M printing scans, respectively, so that plural dots of the same type of color may be printed at the same area by at least two printing scans; and a printing step to print dots in the print permitted dot areas in each of the 2M printing scans (Scan 1 to Scan 2M) according to the divided image data, wherein the mask is configured so that i) a number of the print permitted dot areas in which printing is permitted both by scans performed before Scan (M+1) and by scans performed after Scan M is larger than a number of the print permitted dot areas in which printing is permitted both by scans performed before Scan (N+1) (N is an integer differing from M and smaller than 2M) and by scans performed after Scan N in the unit area, ii) a number of the print permitted dot areas in which printing is permitted both by scans performed before Scan (M−L+1) (L is a positive integer and L≤M−2) and by scans performed after Scan (M−L) is smaller than a number of the print permitted dot areas in which printing is permitted both by scans performed before Scan (M−L+2) and by scans performed after Scan (M−L+1) in the unit area, and a number of the print permitted dot areas in which printing is permitted both by scans performed before Scan (M+L+1) and by scans performed after Scan (M+L) is larger than a number of the print permitted dot areas in which printing is permitted both by scans performed before Scan (M+L+2) and by scans performed after Scan (M+L+1) in the unit area, and iii) as for at least one combination of S and T (S and T are different and positive integers smaller than 2M), a difference between a number of the print permitted dot areas in which printing is permitted both by scans performed before Scan (S+1) and by scans performed after Scan S and a number of the print permitted dot areas in which printing is permitted both by scans performed before Scan (S+2) and by scans performed after Scan (S+1), is different from a difference between a number of the print permitted dot areas in which printing is permitted both by scans performed before Scan (T+1) and by scans performed after Scan T and a number of the print permitted dot areas in which printing is permitted both by scans performed before Scan (T+2) and by scans performed after Scan (T+1).

8. The printing apparatus according to claim 1, wherein S is larger than T and S and T are smaller than (M−2), the difference between the number of the print permitted dot areas in which printing is permitted both by scans performed before Scan (S+1) and by scans performed after Scan S and the number of the print permitted dot areas in which printing is permitted both by scans performed before Scan (S+2) and by scans performed after Scan (S+1), is smaller than the difference between the number of the print permitted dot areas in which printing is permitted both by scans performed before Scan (T+1) and by scans performed after Scan T and the number of the print permitted dot areas in which printing is permitted both by scans performed before Scan (T+2) and by scans performed after Scan (T+1).

9. The printing method according to claim 7, wherein S is larger than T and S and T are smaller than (M−2), the difference between a number of the print permitted dot areas in which printing is permitted both by scans performed before Scan (S+1) and by scans performed after Scan S and a number of the print permitted dot areas in which printing is permitted both by scans performed before Scan (S+2) and by scans performed after Scan (S+1), is smaller than the difference between a number of the print permitted dot areas in which printing is permitted both by scans performed before Scan (T+1) and by scans performed after Scan T and a number of the print permitted dot areas in which printing is permitted both by scans performed before Scan (T+2) and by scans performed after Scan (T+1).

* * * * *